(12) United States Patent
Naka et al.

(10) Patent No.: US 8,451,421 B2
(45) Date of Patent: May 28, 2013

(54) LIQUID CRYSTAL OPTICAL ELEMENT AND OPTICAL PICKUP APPARATUS

(75) Inventors: Shuji Naka, Huchu (JP); Shinya Sato, Koganei (JP)

(73) Assignee: Citizen Holdings Co., Ltd., Tokyo (JP)

( * ) Notice: Subject to any disclaimer, the term of this patent is extended or adjusted under 35 U.S.C. 154(b) by 787 days.

(21) Appl. No.: 12/293,526

(22) PCT Filed: Feb. 16, 2007

(86) PCT No.: PCT/JP2007/053341
§ 371 (c)(1),
(2), (4) Date: Sep. 18, 2008

(87) PCT Pub. No.: WO2007/108274
PCT Pub. Date: Sep. 27, 2007

(65) Prior Publication Data
US 2009/0167965 A1 Jul. 2, 2009

(30) Foreign Application Priority Data

Mar. 20, 2006 (JP) ................................. 2006-076556

(51) Int. Cl.
*G02F 1/13* (2006.01)
*G02F 1/1347* (2006.01)
*G02F 1/1335* (2006.01)
*G11B 7/00* (2006.01)

(52) U.S. Cl.
USPC ........... 349/200; 349/74; 349/98; 369/112.02

(58) Field of Classification Search
USPC .................. 349/117–121, 200, 99, 102, 193, 349/74, 201, 202, 98; 369/112.02
See application file for complete search history.

(56) References Cited

U.S. PATENT DOCUMENTS 5,949,748 A * 9/1999 Iwasaki et al. ................ 369/53.2
2005/0174504 A1* 8/2005 Hashimoto ..................... 349/54

FOREIGN PATENT DOCUMENTS

| JP | 11-96574 | | 4/1999 |
| JP | 2001034996 A | * | 2/2001 |
| JP | 2005-141839 | | 6/2005 |

* cited by examiner

*Primary Examiner* — Edward Glick
*Assistant Examiner* — Dennis Y Kim
(74) *Attorney, Agent, or Firm* — Finnegan, Henderson, Farabow, Garrett & Dunner, L.L.P.

(57) ABSTRACT

The present invention is directed to the provision of an optical pickup apparatus in which a liquid crystal optical element constructed by combining an aberration correcting liquid crystal panel and an nλ/4 liquid crystal panel in an integral fashion is mounted in a tilted position. More specifically, the invention provides a liquid crystal optical element includes a first liquid crystal layer having a first rubbing direction and for correcting aberration, a second liquid crystal layer having a second rubbing direction and combined with the first liquid crystal layer in an integral fashion, and a transparent electrode for generating a potential difference across the second liquid crystal layer in order to control an amount of phase difference for the light beam passing through the second liquid crystal layer, and wherein the angle ($\psi$) that the second rubbing direction makes with the first rubbing direction is determined in accordance with the tilt angle ($\alpha$) so that the second liquid crystal layer functions as an nλ/4 plate. The invention also provides an optical pickup apparatus incorporating such a liquid crystal optical element.

15 Claims, 17 Drawing Sheets

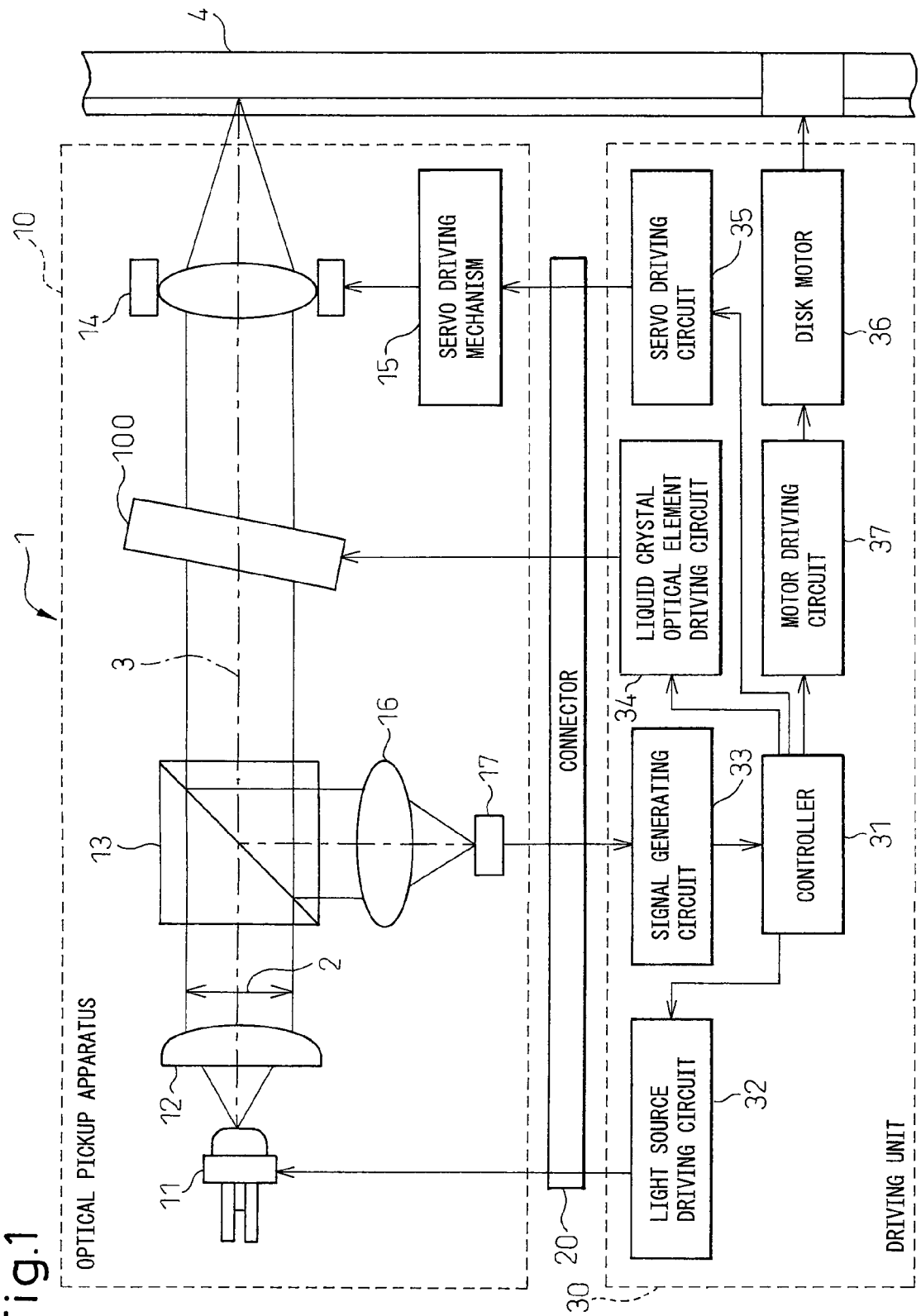

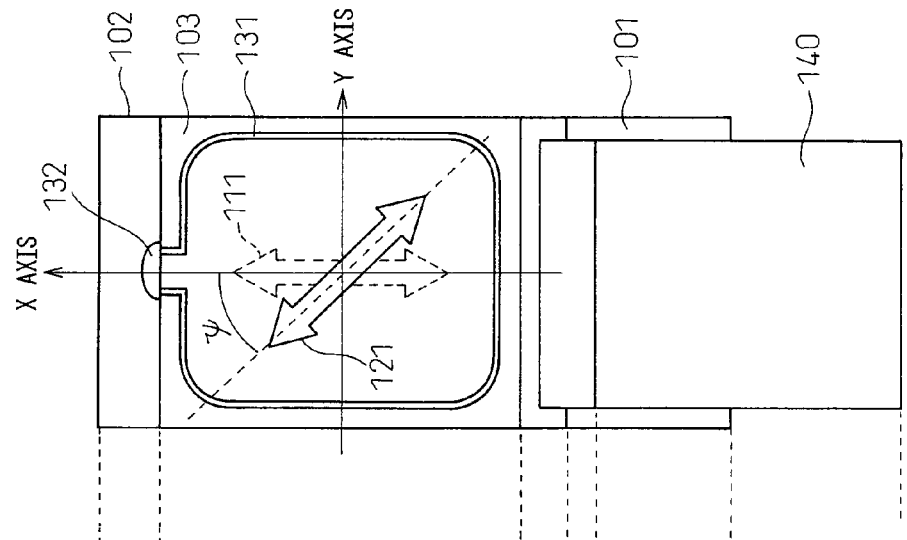
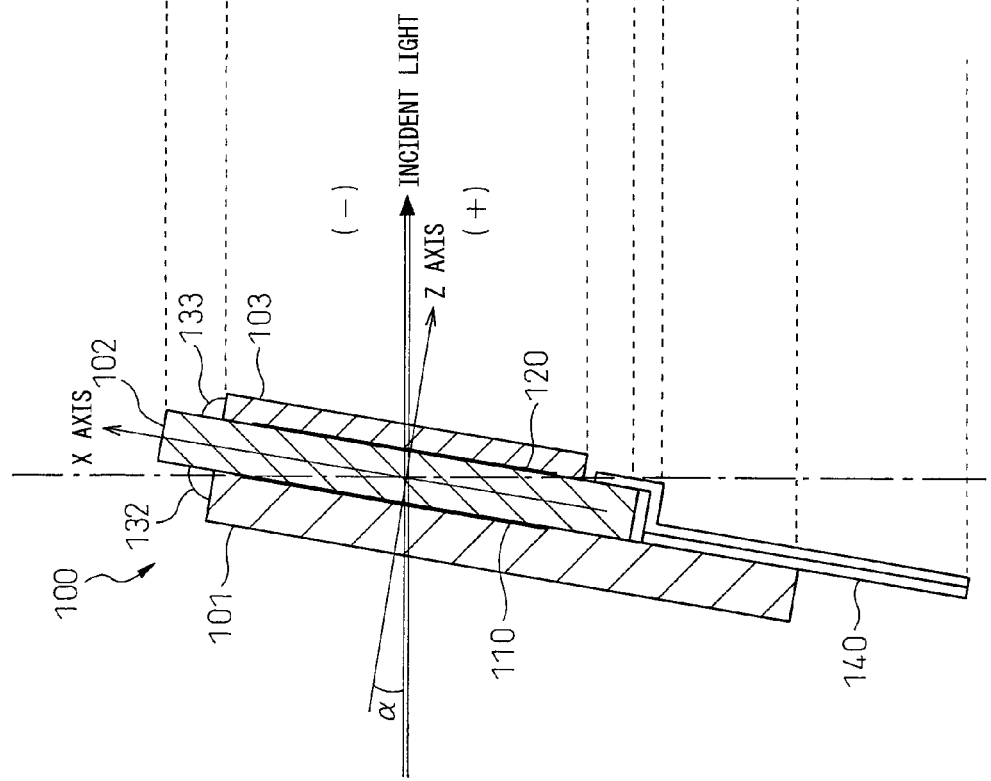

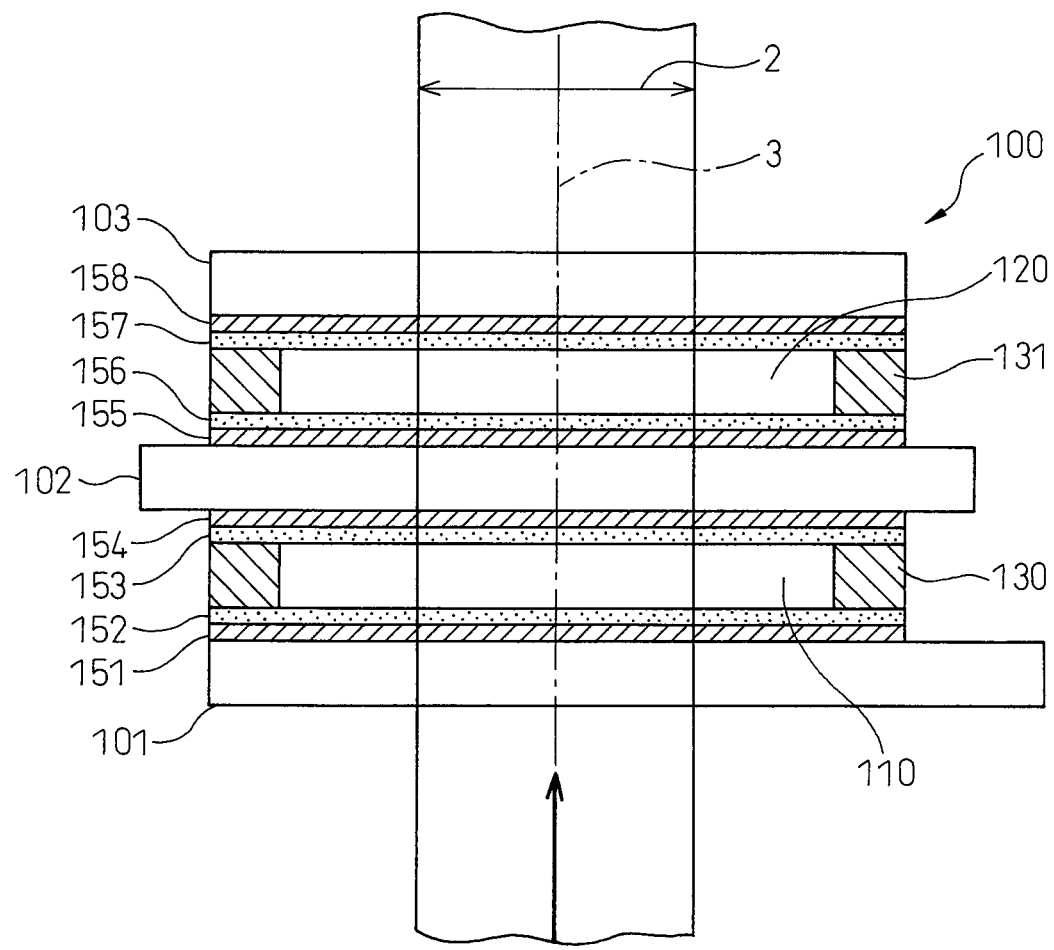

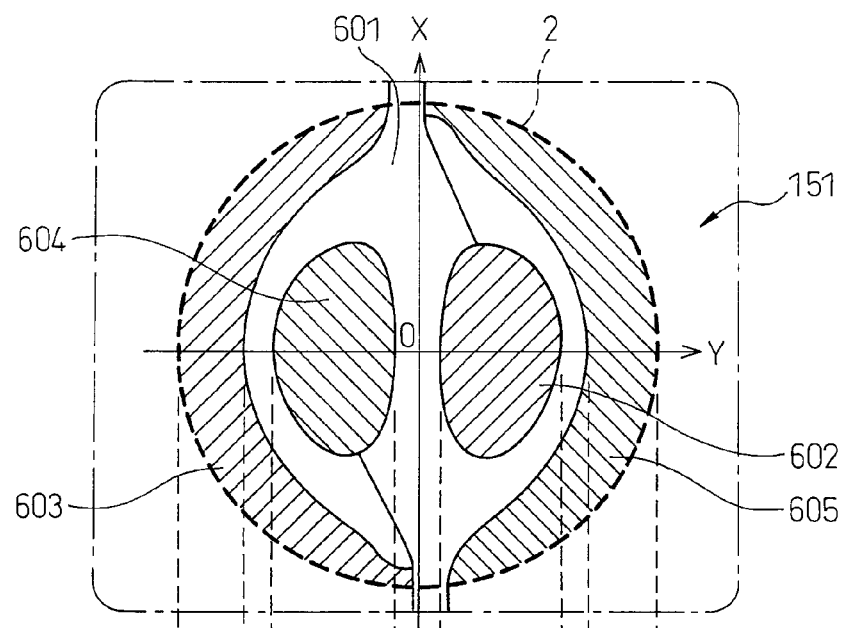
Fig.15(a)
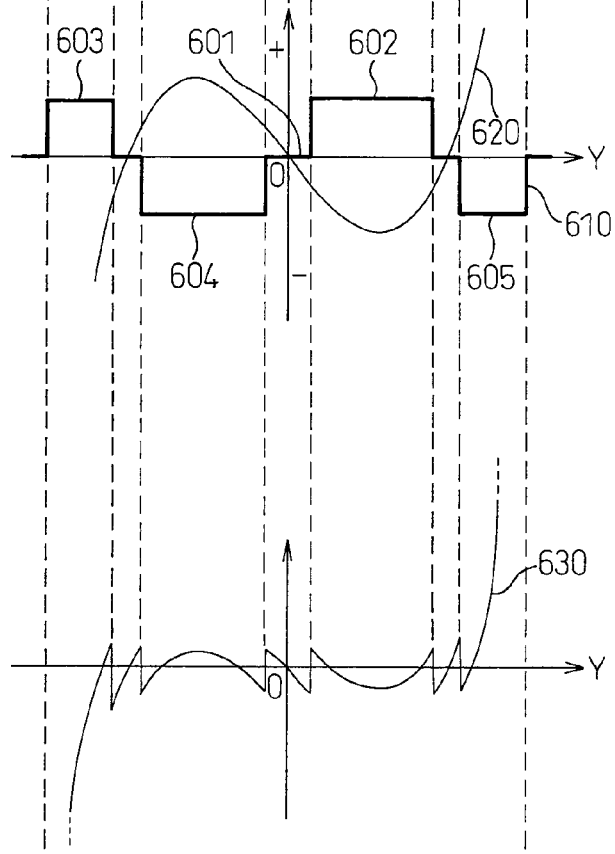
Fig.15(b)
Fig.15(c)

LIQUID CRYSTAL OPTICAL ELEMENT AND OPTICAL PICKUP APPARATUS

FIELD OF THE INVENTION

The present invention relates to a liquid crystal optical element and an optical pickup apparatus, and more specifically to a liquid crystal optical element having an aberration correcting function, as well as a function of an $n\lambda/4$ plate, and an optical pickup apparatus incorporating such a liquid crystal optical element.

BACKGROUND OF THE INVENTION

For a liquid crystal panel that functions as a quarter-wave plate, it is known to provide a configuration in which the liquid crystal panel is tilted with respect to the optical axis by an angle equal to the angle (pretilt angle) that the long axis direction of liquid crystal molecules makes with the glass substrate (refer, for example, to patent document 1). By tilting the liquid crystal panel in this manner, the long axis direction of the liquid crystal molecules can be oriented at right angles to the optical axis, and the liquid crystal panel can thus be made to function as a perfect quarter-wave plate.

It is also known to provide a liquid crystal panel in which two liquid crystal layers are formed using three glass substrates, one liquid crystal layer being formed as an aberration correcting layer and the other as a quarter-wave plate (refer, for example, to patent document 2). In the liquid crystal panel described in patent document 2, the rubbing direction of the liquid crystal layer formed as the quarter-wave plate is oriented at an angle of 45 degrees relative to the rubbing direction of the aberration correcting liquid crystal layer, and the liquid crystal panel thus fabricated is arranged perpendicularly relative to the optical axis.

Patent document 1: Japanese Patent Publication No. 3142251 (page 3 and FIG. 2)

Patent document 2: Japanese Unexamined Patent Publication No. 2001-34996 (page 29 and FIG. 21).

SUMMARY OF THE INVENTION

If the aberration correcting liquid crystal panel is arranged perpendicularly relative to the optical axis, a problem arises in which light emitted from a light source is reflected by the liquid crystal panel directly back to the light source, causing the light rays to interfere with each other and resulting in the generation of noise, and hence an inability to obtain light of stable intensity from the light source. Accordingly, the aberration correcting liquid crystal panel needs to be tilted at a certain angle with respect to the optical axis. Further, when tilting the aberration correcting liquid crystal panel, it must be tilted in a direction perpendicular to its rubbing direction (the long axis direction of the liquid crystal molecules). If it is not tilted in such a direction, the aberration correcting liquid crystal panel will cause the direction of polarization of light to rotate, and thus the aberration correcting liquid crystal panel will become unable to perform its intended function for the light contained in the effective light beam.

On the other hand, in the $\lambda/4$ liquid crystal panel, a pretilt angle is provided between the long axis direction of the liquid crystal molecules and the direction parallel to the transparent glass substrate. Accordingly, if the $\lambda/4$ liquid crystal panel is not used by tilting it so as to reduce the pretilt angle to zero, there arises the problem that, because of its incidence angle dependence, the liquid crystal panel does not function as an accurate $\lambda/4$ plate.

Consider a liquid crystal optical element constructed by combining in an integral fashion the aberration correcting liquid crystal panel and the $\lambda/4$ liquid crystal panel whose rubbing direction is oriented at 45 degrees relative to the rubbing direction of the aberration correcting liquid crystal panel; if this liquid crystal optical element is tilted, both the aberration correcting liquid crystal panel and the $\lambda/4$ liquid crystal panel will tilt in the same direction as a matter of course. However, the rubbing direction of the aberration correcting liquid crystal panel and the direction that reduces the pretilt angle of the $\lambda/4$ liquid crystal panel to zero cannot be the same. As a result, the liquid crystal optical element constructed by combining the aberration correcting liquid crystal panel and the $\lambda/4$ liquid crystal panel in an integral fashion cannot be used in a tilted position in an optical pickup apparatus. The reason that the rubbing direction of the $\lambda/4$ liquid crystal panel is oriented at 45 degrees relative to the rubbing direction of the aberration correcting liquid crystal panel is that by so orienting the rubbing direction, the prescribed linearly polarized light passed through the aberration correcting liquid crystal panel can be converted to nearly perfect circularly polarized light by the $\lambda/4$ liquid crystal panel.

Accordingly, it is an object of the present invention to provide a liquid crystal optical element and an optical pickup apparatus that can resolve the above problem.

It is also an object of the present invention to provide an optical pickup apparatus in which a liquid crystal optical element constructed by combining an aberration correcting liquid crystal panel and a $\lambda/4$ liquid crystal panel in an integral fashion is mounted in a tilted position.

An optical pickup apparatus according to the present invention includes a light source for emitting a light beam, a liquid crystal optical element constructed by combining in an integral fashion a first liquid crystal layer having a first rubbing direction and for correcting aberration and a second liquid crystal layer having a second rubbing direction, the liquid crystal optical element being mounted tilted at a prescribed angle with respect to an optical axis of the light beam, a transparent electrode for generating a potential difference across the second liquid crystal layer in order to control an amount of phase difference for the light beam passing through the second liquid crystal layer, and an objective lens for focusing the light beam passed through the liquid crystal optical element, and wherein the angle that the second rubbing direction makes with the first rubbing direction is determined in accordance with the tilt angle so that the second liquid crystal layer functions as an $n\lambda/4$ plate.

Preferably, in the optical pickup apparatus according to the present invention, the second rubbing direction of the second liquid crystal layer is determined in accordance with the tilt angle of the liquid crystal optical element and the potential difference so that the second liquid crystal layer functions as an $n\lambda/4$ plate.

Further preferably, in the optical pickup apparatus according to the present invention, the second rubbing direction of the second liquid crystal layer is determined in accordance with the tilt angle of the liquid crystal optical element, the potential difference, and an operating temperature range so that the second liquid crystal layer functions as an $n\lambda/4$ plate.

A liquid crystal optical element according to the present invention includes a first liquid crystal layer having a first rubbing direction and for correcting aberration, a second liquid crystal layer having a second rubbing direction and combined with the first liquid crystal layer in an integral fashion, and a transparent electrode for generating a potential difference across the second liquid crystal layer in order to control an amount of phase difference for the light beam passing through the second liquid crystal layer, and wherein the angle that the second rubbing direction makes with the first rubbing direction is determined in accordance with the tilt angle so that the second liquid crystal layer functions as an nλ/4 plate.

Preferably, in the liquid crystal optical element according to the present invention, the angle that the second rubbing direction makes with the first rubbing direction is determined in accordance with the tilt angle and the potential difference so that the second liquid crystal layer functions as an nλ/4 plate.

Preferably, in the optical pickup apparatus and the liquid crystal optical element according to the present invention, the first liquid crystal layer corrects coma, spherical aberration, or astigmatism.

Preferably, in the optical pickup apparatus and the liquid crystal optical element according to the present invention, the first liquid crystal layer and the second liquid crystal layer are provided alternately between three transparent substrates.

According to the present invention, as the liquid crystal optical element is constructed by combining the aberration correcting liquid crystal panel and the nλ/4 liquid crystal panel in an integral fashion, the aberration correcting liquid crystal panel and the nλ/4 liquid crystal panel can be arranged in a single setup procedure.

Further, according to the present invention, using the liquid crystal optical element constructed by combining the aberration correcting liquid crystal panel and the nλ/4 liquid crystal panel in an integral fashion, not only can reflections be prevented from occurring at the aberration correcting liquid crystal panel, but at the same time, the nλ/4 liquid crystal panel can be made to function as an accurate nλ/4 plate.

Furthermore, according to the present invention, the angle Ψ that the rubbing direction of the second liquid crystal layer makes with the rubbing direction of the first liquid crystal layer for optimum operation of the nλ/4 liquid crystal panel can be determined based on the tilt angle α, etc.

BRIEF DESCRIPTION OF THE DRAWINGS

FIG. 1 is a schematic diagram showing the configuration of an optical apparatus 1 which includes an optical pickup apparatus and a liquid crystal optical element according to the present invention.

FIG. 2(a) is a cross-sectional view of the liquid crystal optical element 100, and FIG. 2(b) is a plan view of the liquid crystal optical element 100 as viewed from the light exit side.

FIG. 3 is a schematic cross-sectional view for explaining the structure of the liquid crystal optical element 100.

FIG. 15(a) is a diagram showing a coma correcting transparent electrode pattern formed as the first transparent electrode 151, FIG. 15(b) is a diagram showing an example of the voltage applied to the transparent electrode pattern of the first transparent electrode 151, and FIG. 15(c) is a diagram showing an example of coma as improved by the transparent electrode pattern of the first transparent electrode 151.

DETAILED DESCRIPTION OF THE PREFERRED EMBODIMENT

Figure 4A:
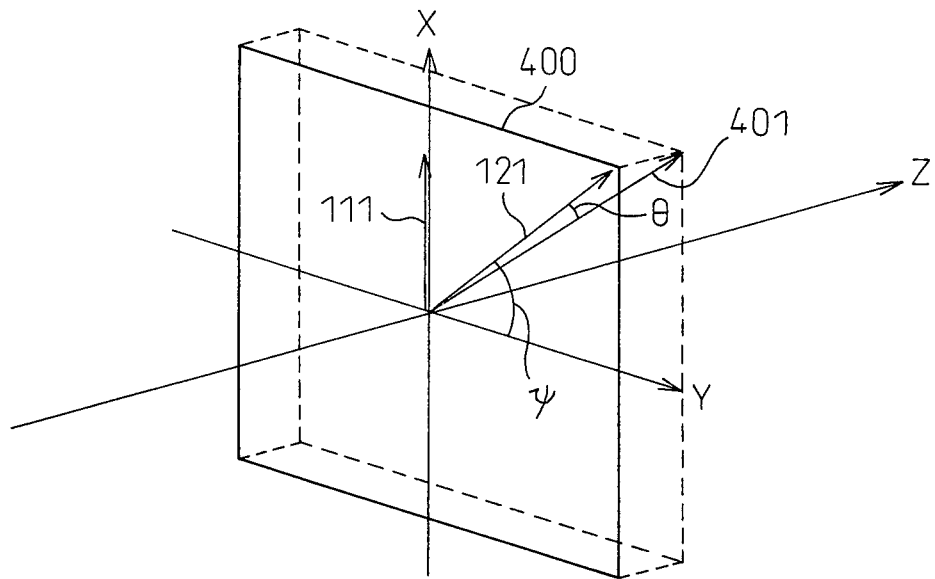
FIG. 4(a) is a diagram showing an arrangement in which the Z-axis of the liquid crystal optical element 100 is oriented parallel to the optical axis (the optical element is not tilted)

An optical pickup apparatus and a liquid crystal optical element according to the present invention will be described below with reference to the drawings. It should, however, be noted that the present invention is not limited by the description given herein, but embraces the inventions described in the appended claims and their equivalents.

FIG. 1 is a schematic diagram showing the configuration of an optical apparatus 1 which includes a liquid crystal optical element and an optical pickup apparatus according to the present invention.

The optical apparatus 1, which comprises the optical pickup apparatus 10, a connector 20, and a driving unit 30, is an apparatus for writing and reading data on a recording medium 4 such as a DVD or CD.

In the optical pickup apparatus 10, a light beam (650 nm) emitted from a light source 11 constructed from a semiconductor laser or the like is converted by a collimator lens 12 into a substantially parallel beam of light which passes through a polarization beam splitter 13 and enters the liquid crystal optical element 100. The light passed through the liquid crystal optical element 100 is focused by an objective lens 14 (numerical aperture NA=0.65) onto the track surface of the recording medium 4. As shown in FIG. 1, the light beam has an effective diameter 2 and an optical axis 3. The tracking motion of the objective lens 14 is controlled by a servo driving mechanism 15 so that the spot focused by the objective lens 14 is accurately positioned on the track.

The light beam reflected from the track of the recording medium 4 again passes through the objective lens 14 and the liquid crystal optical element 100, and enters the polarization beam splitter 13 where the direction of the light beam is changed and the light beam is focused by a converging lens 16 onto a light detector 17. The light beam, when reflected at the recording medium 4, is amplitude-modulated by the information (pit) recorded on the track surface of the recording medium 4.

The driving unit 30 includes a light source driving circuit 32 for driving the light source 11, a signal generating circuit 33 which outputs a light intensity signal (RF) based on a light detection signal supplied from the light detector 17, a liquid crystal optical element driving circuit 34 for driving the liquid crystal optical element 100, a servo driving circuit 35 for driving the servo driving mechanism 15, a disk motor 36 for rotating the recording medium 4, a motor driving circuit 37 for driving the disk motor 36, and a controller 31, containing a RAM, ROM, CPU, etc., for controlling the entire operation.

The liquid crystal optical element 100, as will be described later, is constructed by combining, in an integral fashion, a first liquid crystal layer 110 that functions as an aberration correcting plate and a second liquid crystal layer 120 that functions as an $n\lambda/4$ plate, and is driven by a supply voltage supplied from the liquid crystal optical element driving circuit 34. Here, the liquid crystal optical element driving circuit 34 may be incorporated in the liquid crystal optical element 100 to be described later.

Based on the light intensity signal generated by the signal generating circuit 33, the controller 31 reads information recorded on the recording medium 4 by rotating the recording medium 4 by means of the disk motor 36 while controlling the light source driving circuit 32 and the servo driving circuit 35.

Further, the controller 31 modulates the intensity of the light beam emitted from the light source 11 in accordance with a data signal to be written, and illuminates the recording medium 4 with the modulated light beam. On the track surface of the recording medium 4 to which the data is to be written, the refractive index or color of a thin film contained in the disk changes or a pit is formed in accordance with the intensity of the light beam, thus accomplishing the data write. The intensity modulation of the light beam is performed, for example, by the light source driving circuit 32 modulating the current to be supplied to the semiconductor laser device used as the light source 11.

The optical pickup apparatus 10 is connected to the driving unit 30 via the connector 20.

FIG. 2 is a diagram schematically showing the structure of the liquid crystal optical element 100.

FIG. 2(*a*) shows a cross-sectional view of the liquid crystal optical element 100, and FIG. 2(*b*) shows a plan view of the liquid crystal optical element 100 as viewed from the light exit side.

As shown in FIG. 2(*a*), the liquid crystal optical element 100 is constructed by stacking a first transparent substrate 101, a second transparent substrate 102, and a third transparent substrate 103 one on top of another. The liquid crystal optical element 100 further includes the first liquid crystal layer 110 as an aberration correcting plate, which is sandwiched between the first and second transparent substrates 101 and 102, and the second liquid crystal layer 120 as an $n\lambda/4$ plate, which is sandwiched between the second and third transparent substrates 102 and 103.

A flexible board 140 is connected to the first and second liquid crystal layers 110 and 120 so that a prescribed voltage is applied to each individual liquid crystal layer from the liquid crystal optical element driving circuit 34.

The first liquid crystal layer 110 is sealed between the first and second transparent substrates 101 and 102 by means of a sealing member 130 and a stopping member 132. Likewise, the second liquid crystal layer 120 is sealed between the second and third transparent substrates 102 and 103 by means of a sealing member 131 and a stopping member 133.

As shown in FIG. 2(*b*), in the liquid crystal optical element 100, the rubbing direction 111 of the first liquid crystal layer 110 and the rubbing direction 121 of the second liquid crystal layer 120 are oriented at an angle $\psi$ relative to each other. The method of determining the angle $\psi$ will be described later.

For explanatory purposes, X-axis, Y-axis, and Z-axis are set relative to the liquid crystal optical element 100, as shown in FIG. 2. The Z-axis indicates the direction perpendicular to the upper surface of the first transparent substrate 101. In the optical pickup apparatus of the present invention, the liquid crystal optical element 100 is tilted at an angle $\alpha$ with respect to the optical axis 3 (which coincides with the direction of the incident light) in order to prevent the light beam emitted from the light source 11 from being reflected by the liquid crystal optical element 100 back toward the light source 11. It is assumed here that the angle $\alpha$ at which the liquid crystal optical element 100 is mounted in the optical pickup apparatus 10 is predetermined.

When tilting the first liquid crystal layer 110 that functions as the aberration correcting plate, if the liquid crystal layer is not tilted in a direction perpendicular to its rubbing direction 111, the linearly polarized light entering the aberration correcting liquid crystal panel will emerge from it as elliptically polarized light. Accordingly, in the present embodiment, when the rubbing direction 111 of the first liquid crystal layer 110 is parallel to the X-axis, the liquid crystal optical element 100 is tilted by the angle $\alpha$ in such a manner as to turn the X-axis about the Y-axis toward the right in the figure. Preferably, the angle $\alpha$ is approximately equal to the pretilt angle of the first liquid crystal layer 110, for example, about 3 degrees, and its direction is the direction that cancels the pretilt angle of the first liquid crystal layer 110. That is, the angle that the Z-axis makes with the optical axis 3 extending parallel to the incident light is the angle $\alpha$. In the case of FIG. 2(*a*), the liquid crystal optical element 100 is tilted to the right in the figure, but alternatively, it may be tilted to the left in the figure. For convenience, the angle by which the liquid crystal optical element 100 is tilted to the right in FIG. 2(*a*) is taken as (+), and the angle by which the liquid crystal optical element 100 is tilted to the left in FIG. 2(*a*) is taken as (−).

FIG. 3 is a schematic cross-sectional view for explaining the structure of the liquid crystal optical element 100.

In FIG. 3, an arrow indicates the direction of the light beam emitted from the light source 11. For convenience of explanation, the thicknesses of the respective elements are exaggerated, and their ratio does not represent the actual thickness ratio.

A first transparent electrode 151 and a first alignment film 152 are formed on the surface of the first transparent substrate 101 that faces the second transparent substrate 102, and a first transparent counter electrode 154 and a second alignment film 153 are formed on the surface of the second transparent substrate 102 that faces the first transparent substrate 101. As earlier described, the first liquid crystal layer 110 is sealed between the first and second transparent substrates 101 and 102 by means of the sealing member 130, etc.

A second transparent counter electrode 155 and a third alignment film 156 are formed on the surface of the second transparent substrate 102 that faces the third transparent substrate 103, and a second transparent electrode 158 and a fourth alignment film 157 are formed on the surface of the third transparent substrate 103 that faces the second transparent substrate 102. As earlier described, the second liquid crystal layer 120 is sealed between the second and third transparent substrates 102 and 103 by means of the sealing member 131, etc.

The first and second liquid crystal layers 110 and 120 are formed from the same liquid crystal and to the same thickness in view of mass-producibility. Further, the first and second liquid crystal layers 110 and 120 are homogeneously aligned (horizontally aligned) liquid crystal layers. The liquid crystal material used for the first and second liquid crystal layers 110 and 120 is a positive nematic liquid crystal with a Δn of 0.21 and a relative permittivity of 6.9; the layer thickness is 6.0 μm.

For the first liquid crystal layer 110 to provide a sufficient amount of phase difference, it is preferable that the refractive index of the liquid crystal material be 0.15 or higher; the higher the refractive index, the better the performance, but a refractive index of 0.3 or less is preferable. This is because a prescribed amount of total phase difference is needed in order for the liquid crystal layers to function as the aberration correcting and nλ/4 plates. Further, if the first and second liquid crystal layers 110 and 120 are made too thin, there arises a manufacturing problem, and if they are made too thick, the response speed of the liquid crystal decreases. Therefore, it is preferable that the first and second liquid crystal layers 110 and 120 be made not thinner than 3 μm but not thicker than 7 μm.

In FIGS. 2 and 3, the liquid crystal optical element 100 is constructed by sandwiching the two liquid crystal layers alternately between the three transparent glass substrates. Alternatively, the liquid crystal optical element 100 may be constructed by forming the liquid crystal layers each between two transparent glass substrates and by bonding them together using an adhesive or the like.

FIG. 4 is a diagram showing the relationship between the rubbing direction of each liquid crystal layer and the tilt of the liquid crystal optical element.

Figure 4B:
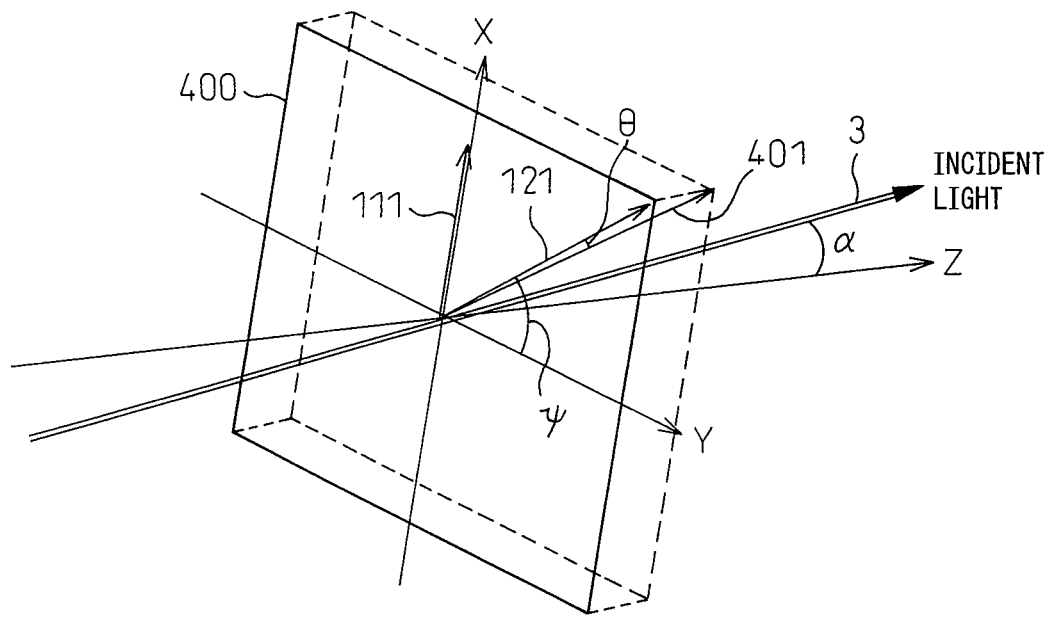
FIG. 4(b) is a diagram showing an arrangement in which the liquid crystal optical element 100 is tilted by an angle α as shown in FIG. 2.

FIG. 4(a) shows an arrangement in which the Z-axis of the liquid crystal optical element 100 is oriented parallel to the optical axis (the optical element is not tilted), and FIG. 4(b) shows an arrangement in which the liquid crystal optical element 100 is tilted by the angle α as previously shown in FIG. 2.

In FIG. 4(a), reference numeral 400 indicates the X-Y plane, and 401 the long axis direction of the liquid crystal molecules in the second liquid crystal layer 120 that functions as the nλ/4 plate. The angle α is the tilt angle of the liquid crystal optical element 100. The angle θ is the pretilt angle of the second liquid crystal layer 120. The angle Ψ is the angle that the rubbing direction 121 of the second liquid crystal layer 120 makes with the rubbing direction 111 of the first liquid crystal layer 110.

When the liquid crystal optical element 100 is tilted by the angle α, the pretilt angle θ of the second liquid crystal layer 120, relative to the optical axis 3, is as shown in FIG. 4(b).

Usually, the angle ψ that the rubbing direction 111 of the first liquid crystal layer 110 makes with the rubbing direction 121 of the second liquid crystal layer 120 is set to 45 degrees so that the prescribed linearly polarized light passed through the polarization beam splitter 13 can be converted to nearly perfect circularly polarized light by the second liquid crystal layer 120 functioning as the nλ/4 plate.

However, when the liquid crystal optical element 100 is tilted by the angle α in a direction perpendicular to the rubbing direction 111 of the first liquid crystal layer 110 in order to prevent reflection, etc., the pretilt angle θ of the second liquid crystal layer 120 is not canceled by the tilt angle α, as can be seen from FIG. 4(b). Therefore, the angle ψ that the rubbing direction 111 of the first liquid crystal layer 110 makes with the rubbing direction 121 of the second liquid crystal layer 120 need not necessarily be set to 45 degrees, but should be set to an angle that can produce a better result. In view of this, in the liquid crystal optical element 100 of the present invention, the angle ψ is determined as will be described later.

FIG. 5 is a diagram for explaining one example of the electrode pattern of the first transparent electrode and its function.

Figure 5A:
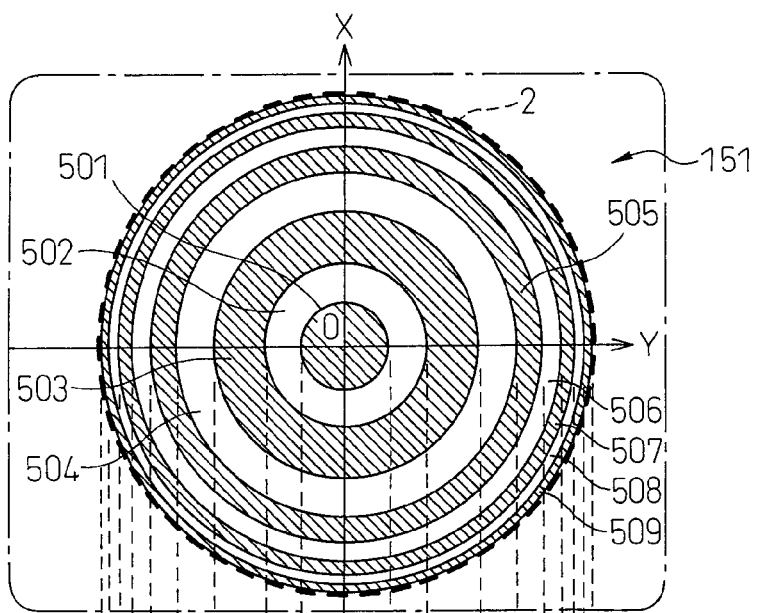
FIG. 5(a) is a diagram showing a spherical aberration correcting transparent electrode pattern formed as a first transparent electrode 151.
Figure 5B:
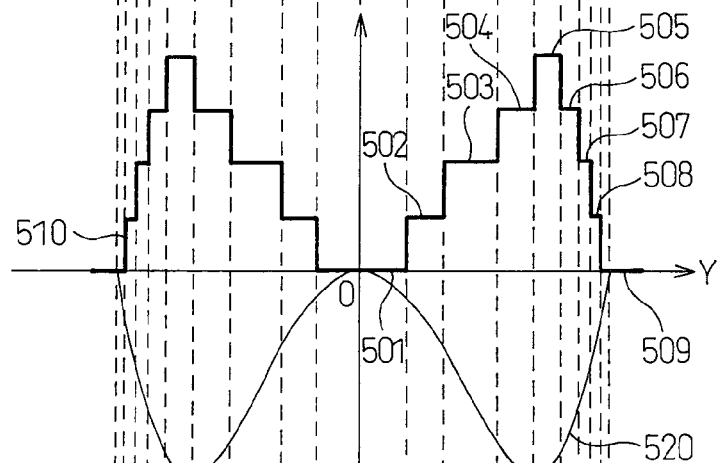
FIG. 5(b) is a diagram showing an example of the voltage applied to the transparent electrode pattern of the first transparent electrode 151.
Figure 5C:
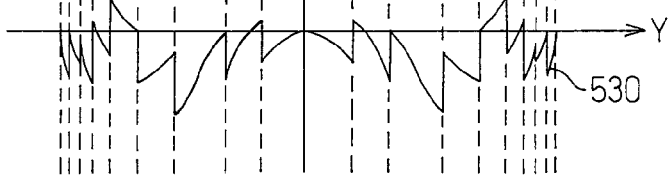
FIG. 5(c) is a diagram showing an example of spherical aberration as improved by the transparent electrode pattern of the first transparent electrode 151.

FIG. 5(a) shows a spherical aberration correcting transparent electrode pattern formed as the first transparent electrode 151, FIG. 5(b) shows an example of the voltage applied to the transparent electrode pattern of the first transparent electrode 151, and FIG. 5(c) shows an example of spherical aberration as improved by the transparent electrode pattern of the first transparent electrode 151.

There are case where, due to imperfections such as irregularities in the thickness of the optically transmissive protective layer on the track surface of the recording medium 4, the distance between the objective lens 14 and the track surface varies or the light spot cannot be always focused in the same condition. Such variations in the distance between the objective lens 14 and the track surface cause spherical aberration in the substrate of the recording medium 4, leading to a degradation of the light intensity signal which is generated based on the reflected beam from the recording medium 4. One example of the spherical aberration measured at the position of the entrance pupil of the objective lens 14 is shown by 520 in FIG. 5(b).

In FIG. 5(a), nine concentric electrode patterns 501 to 509 are formed within the range of the effective diameter 2. Voltage 510 such as shown in FIG. 5(b) is applied to each region. When the voltage 510 such as shown in FIG. 5(b) is applied to the transparent electrode pattern of the first transparent electrode 151 such as shown in FIG. 5(a), a potential difference occurs with respect to the first transparent counter electrode 154, and the alignment of the liquid crystal between them changes according to the potential difference. As a result, the light beam passing through this portion experiences an effect that advances its phase according to the potential difference. With this effect, the spherical aberration 520 occurring in the substrate of the recording medium 4 is corrected as shown by the spherical aberration 530 in FIG. 5(c). Here, the voltage to be applied to the transparent electrode pattern of the first transparent electrode 151 is supplied via the flexible board 140.

In the present embodiment, the first liquid crystal layer 110 has been constructed to correct spherical aberration but, for aberrations other than spherical aberration, it can be constructed to correct coma or astigmatism, as will be described later.

Figure 6:
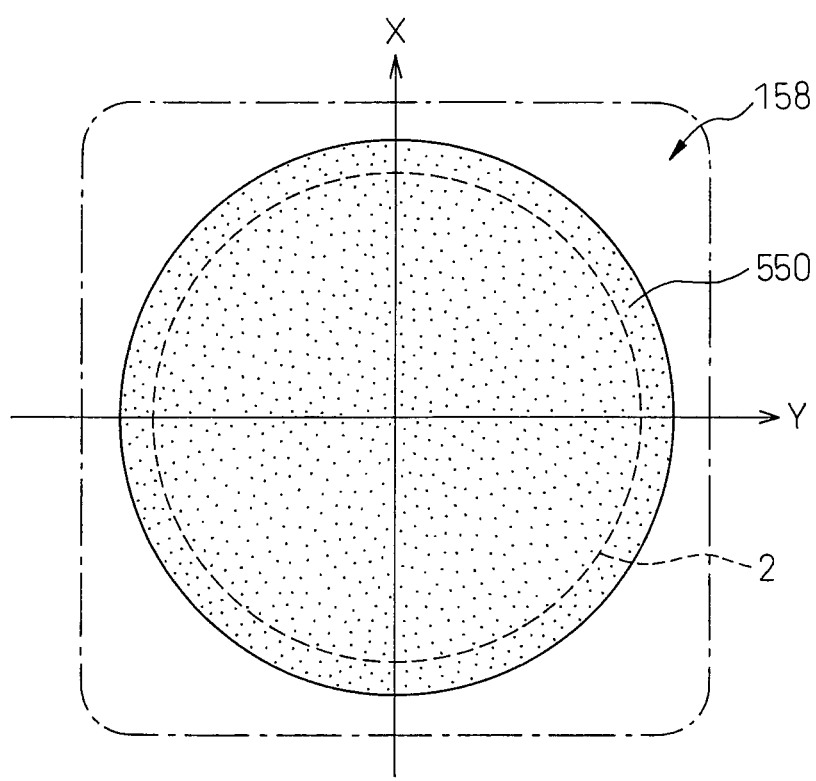
FIG. 6 is a diagram showing one example of the electrode pattern of a second transparent electrode.

FIG. 6 is a diagram showing one example of the electrode pattern of the second transparent electrode.

A circular transparent electrode pattern 550, which is formed as the electrode pattern of the second transparent electrode 158, is for generating a potential difference with respect to the second transparent counter electrode 155 and thereby causing the second liquid crystal layer 120 to function as an nλ/4 plate. The shape of the transparent electrode pattern 550 is not limited to a circular shape, the only requirement being that the pattern be sized and shaped so as to contain the effective diameter 2 of the light beam. The voltage to be applied to the transparent electrode pattern of the second transparent electrode 158 is supplied via the flexible board 140.

Figure 7:
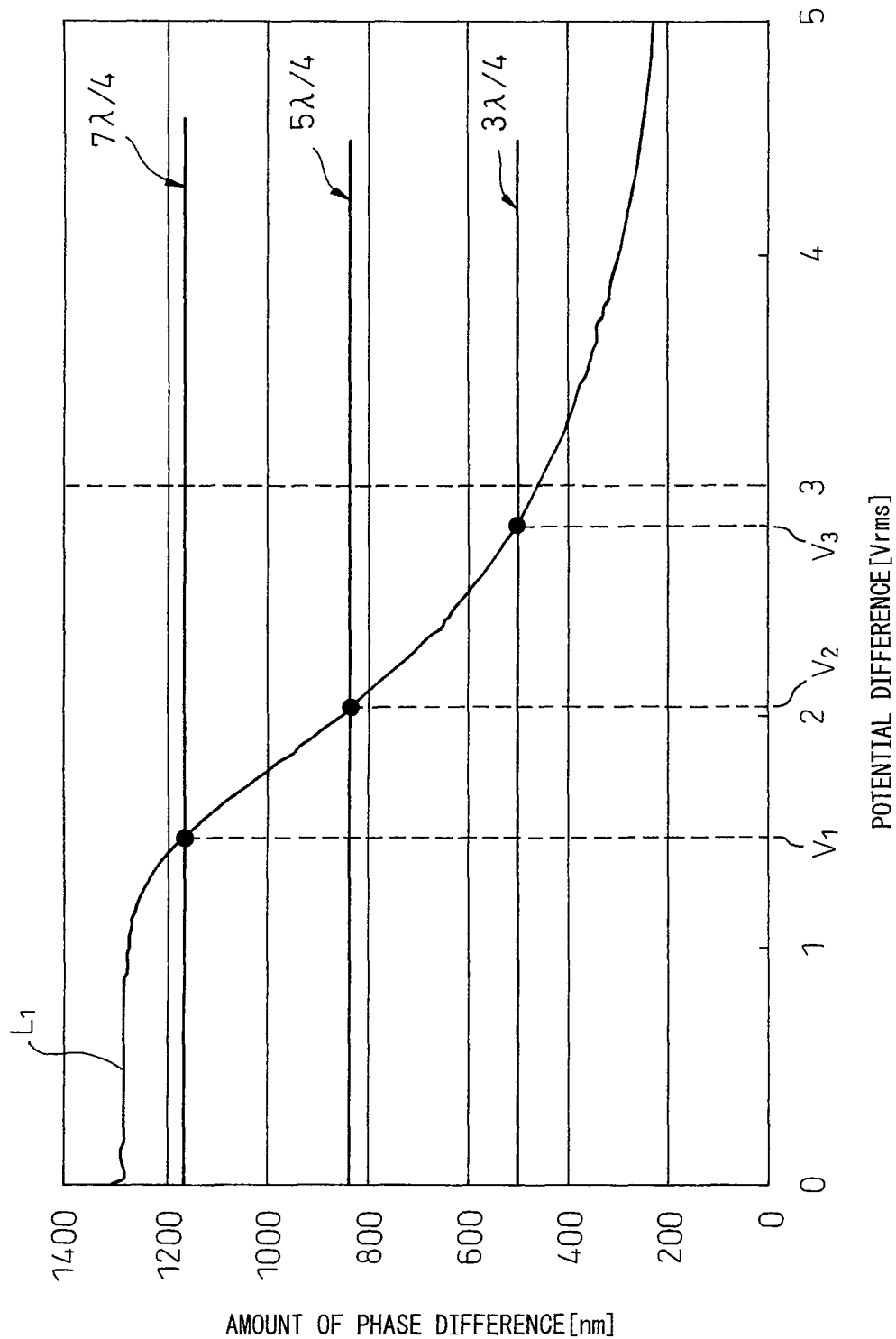
FIG. 7 is a diagram showing the relationship between potential difference and ellipticity.

FIG. 7 is a diagram showing the relationship between the potential difference occurring between the second transparent electrode 158 and second transparent counter electrode 155 of the second liquid crystal layer and the amount of phase difference introduced into the light beam passing through the second liquid crystal layer.

FIG. 7 shows the results of the measurements made using the light source of 650 nm and the second liquid crystal layer 120 of 6.0 μm thickness formed from a homogeneously aligned positive nematic liquid crystal (Δn: 0.21, relative permittivity: 6.9). In FIG. 7, curve $L_1$ is a graph of the measurements taken when the ambient temperature was 25° C.

As shown by the curve $L_1$, the potential differences where the second liquid crystal layer 120 functions as a so-called λ/4 plate (that is, as a (½)λ±(n/4)λ plate, where λ=650 nm) are $V_1$ where it functions as a 7λ/4 plate, $V_2$ where it functions as a 5λ/4 plate, and $V_3$ where it functions as a 3λ/4 plate. If the applied voltage to the second liquid crystal layer 120 is increased, the potential difference where it functions as a λ/4 plate may also be used. However, since the maximum potential difference when the liquid crystal optical element 100 is used in a small portable apparatus is considered to be about 5 V, the values up to the potential difference of 5V are shown in FIG. 7.

By considering the wavelength of the light source used and the structure of the second liquid crystal layer 120 in conjunction with the various conditions under which the liquid crystal optical element 100 is operated, it can be determined as which type of nλ/4 plate the second liquid crystal layer should be made to function.

FIGS. 8 to 13 are diagrams showing the relationship between the angle ψ and ellipticity when the tilt angle α is varied from +0.5 degree to +3.0 degrees in increments of 0.5 degree.

In making the measurements, the potential difference to be applied was determined using the curve $L_1$ (ambient temperature: 25° C.) shown in FIG. 7, the second liquid crystal layer was made to function as a 7λ/4, 5λ/4, and 3λ/4 plate, respectively, and the ellipticity was measured by varying the angle ψ from 41 degrees to 49 degrees in increments of one degree. The measurement of the ellipticity was performed using a rotating analyzer method at an ambient temperature of 25° C. That is, for the light beam (650 nm) passing through the liquid crystal optical element 100, the optical power ratio was measured by an optical power meter while rotating the polarizer. Further, in making the measurements, a special element in which the second liquid crystal layer was formed in such a manner as to be rotatable relative to the first liquid crystal layer was fabricated. Further, the first and second liquid crystal layers were each formed from a homogeneously aligned positive nematic liquid crystal (Δn: 0.21, relative permittivity: 6.9) with a layer thickness of 6.0 μm (the same structure as the second liquid crystal layer in FIG. 7).

Here, for the liquid crystal layer to function effectively as an nλ/4 plate, it is desirable that the ellipticity be not smaller than 0.95.

Figure 8:
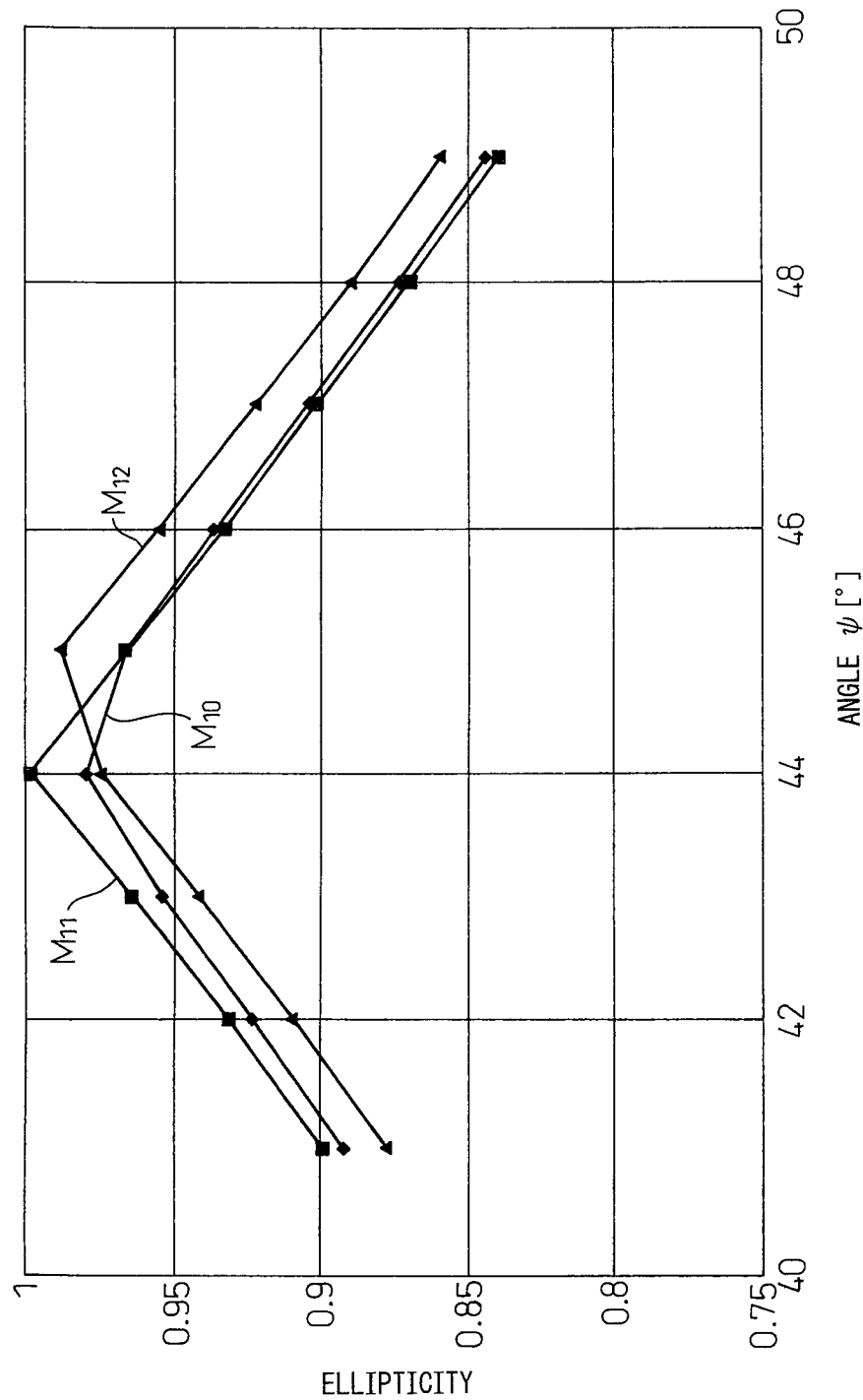
FIG. 8 is a diagram showing the relationship between angle Ψ and ellipticity when the angle α is +0.5 degree.

FIG. 8 is a diagram showing the relationship between the angle ψ and the ellipticity when the angle α is +0.5 degree.

In FIG. 8, curve $M_{10}$ shows the case where the second liquid crystal layer 120 was made to function as a 7λ/4 plate, curve $M_{11}$ shows the case where the second liquid crystal layer 120 was made to function as a 5λ/4 plate, and curve $M_{12}$ shows the case where the second liquid crystal layer 120 was made to function as a 3λ/4 plate. The plus and minus signs of the angle α indicate the same directions as those defined in FIG. 2(a).

As shown in FIG. 8, it can be seen that when the second liquid crystal layer 120 is made to function as a 7λ/4 plate, the second liquid crystal layer 120 functions most effectively as the so-called λ/4 plate when the angle ψ is 44 degrees, and functions effectively as the so-called λ/4 plate when the angle ψ is within the range of 43 to 45 degrees. It can also been seen that when the second liquid crystal layer 120 is made to function as a 5λ/4 plate, the second liquid crystal layer 120 functions most effectively as the so-called λ/4 plate when the angle ψ is 44 degrees, and functions effectively as the so-called λ/4 plate when the angle ψ is within the range of 43 to 45 degrees. Further, it can be seen that when the second liquid crystal layer 120 is made to function as a 3λ/4 plate, the second liquid crystal layer 120 functions most effectively as the so-called λ/4 plate when the angle ψ is 45 degrees, and functions effectively as the so-called λ/4 plate when the angle ψ is within the range of 44 to 46 degrees.

Figure 9:
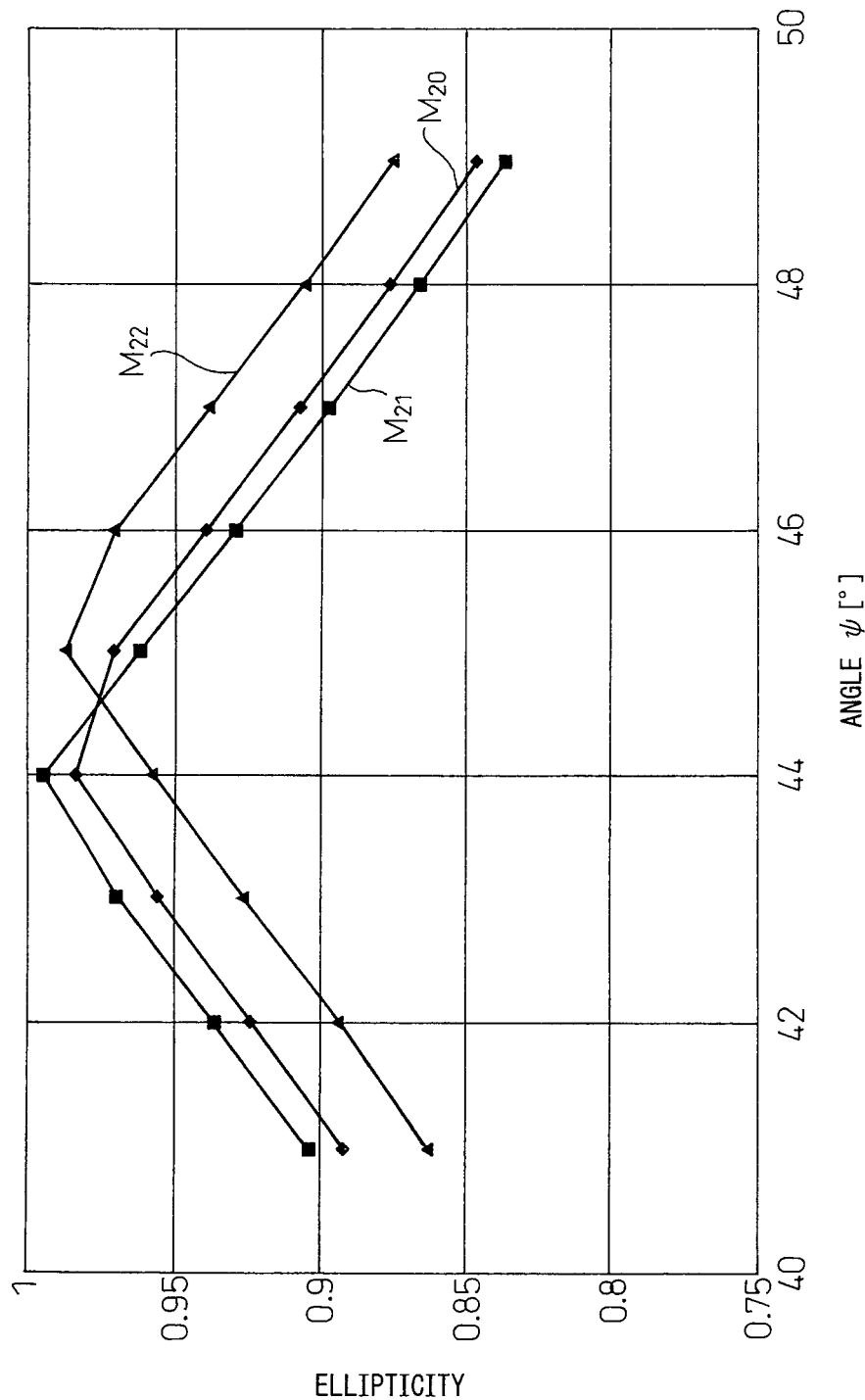
FIG. 9 is a diagram showing the relationship between angle Ψ and ellipticity when the angle α is +1.0 degree.

FIG. 9 is a diagram showing the relationship between the angle ψ and the ellipticity when the angle α is +1.0 degree.

In FIG. 9, curve $M_{20}$ shows the case where the second liquid crystal layer 120 was made to function as a 7λ/4 plate, curve $M_{21}$ shows the case where the second liquid crystal layer 120 was made to function as a 5λ/4 plate, and curve $M_{22}$ shows the case where the second liquid crystal layer 120 was made to function as a 3λ/4 plate. The plus and minus signs of the angle α indicate the same directions as those defined in FIG. 2(a).

As shown in FIG. 9, it can be seen that when the second liquid crystal layer 120 is made to function as a 7λ/4 plate, the second liquid crystal layer 120 functions most effectively as the so-called λ/4 plate when the angle ψ is 44 degrees, and functions effectively as the so-called λ/4 plate when the angle ψ is within the range of 43 to 45 degrees. It can also been seen that when the second liquid crystal layer 120 is made to function as a 5λ/4 plate, the second liquid crystal layer 120 functions most effectively as the so-called λ/4 plate when the angle ψ is 44 degrees, and functions effectively as the so-called λ/4 plate when the angle ψ is within the range of 43 to 45 degrees. Further, it can be seen that when the second liquid crystal layer 120 is made to function as a 3λ/4 plate, the second liquid crystal layer 120 functions most effectively as the so-called λ/4 plate when the angle ψ is 45 degrees, and functions effectively as the so-called λ/4 plate when the angle ψ is within the range of 44 to 46 degrees.

Figure 10:
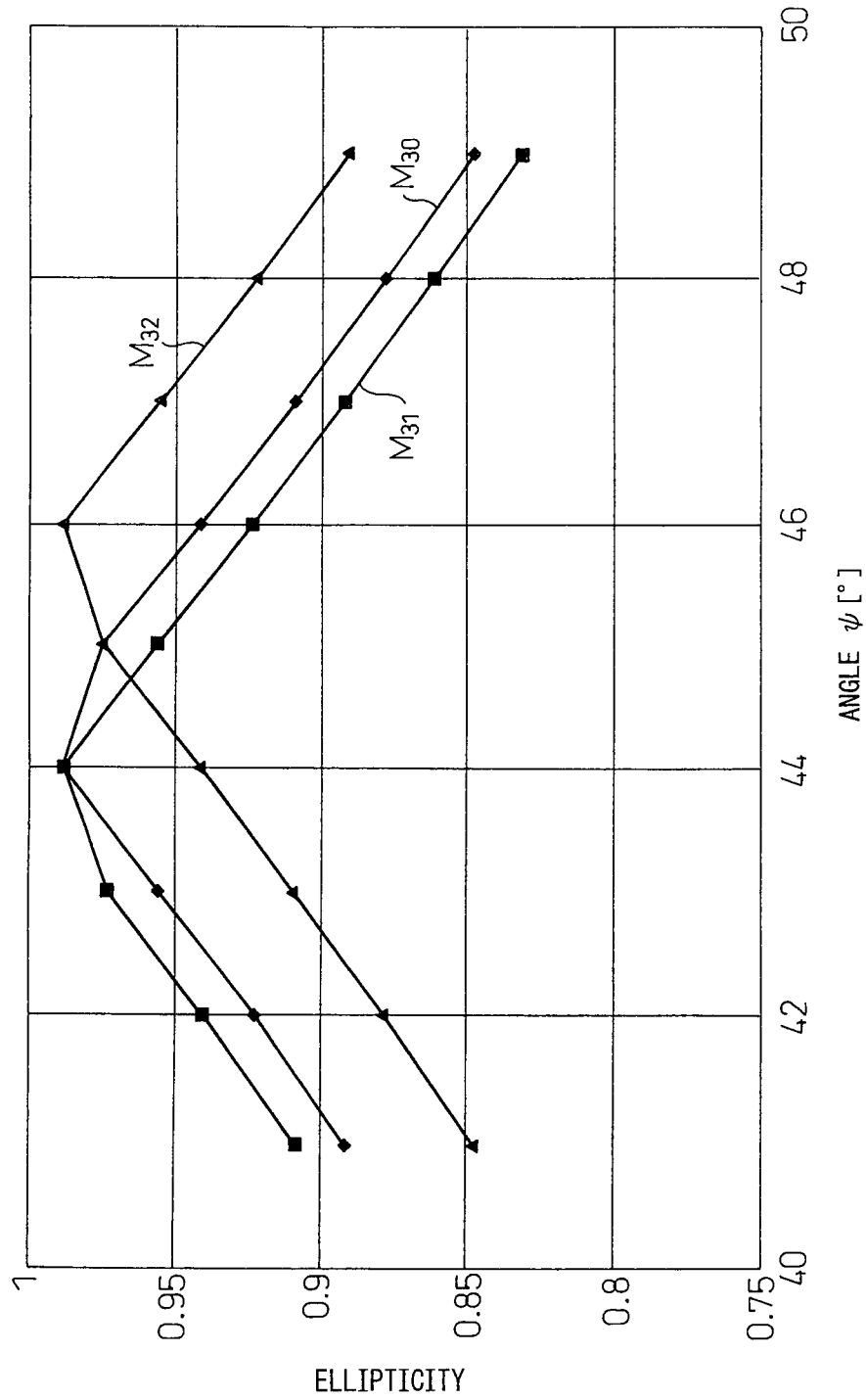
FIG. 10 is a diagram showing the relationship between angle Ψ and ellipticity when the angle α is +1.5 degrees.

FIG. 10 is a diagram showing the relationship between the angle ψ and the ellipticity when the angle α is +1.5 degrees.

In FIG. 10, curve $M_{30}$ shows the case where the second liquid crystal layer 120 was made to function as a 7λ/4 plate, curve $M_{31}$ shows the case where the second liquid crystal layer 120 was made to function as a 5λ/4 plate, and curve $M_{32}$ shows the case where the second liquid crystal layer 120 was made to function as a 3λ/4 plate. The plus and minus signs of the angle α indicate the same directions as those defined in FIG. 2(a).

As shown in FIG. 10, it can be seen that when the second liquid crystal layer 120 is made to function as a 7λ/4 plate, the second liquid crystal layer 120 functions most effectively as the so-called λ/4 plate when the angle ψ is 44 degrees, and functions effectively as the so-called λ/4 plate when the angle ψ is within the range of 43 to 45 degrees. It can also been seen that when the second liquid crystal layer 120 is made to function as a 5λ/4 plate, the second liquid crystal layer 120 functions most effectively as the so-called λ/4 plate when the angle ψ is 44 degrees, and functions effectively as the so-called λ/4 plate when the angle ψ is within the range of 43 to 45 degrees. Further, it can be seen that when the second liquid crystal layer 120 is made to function as a 3λ/4 plate, the second liquid crystal layer 120 functions most effectively as the so-called λ/4 plate when the angle ψ is 46 degrees, and functions effectively as the so-called λ/4 plate when the angle γ is within the range of 45 to 47 degrees.

Figure 11:
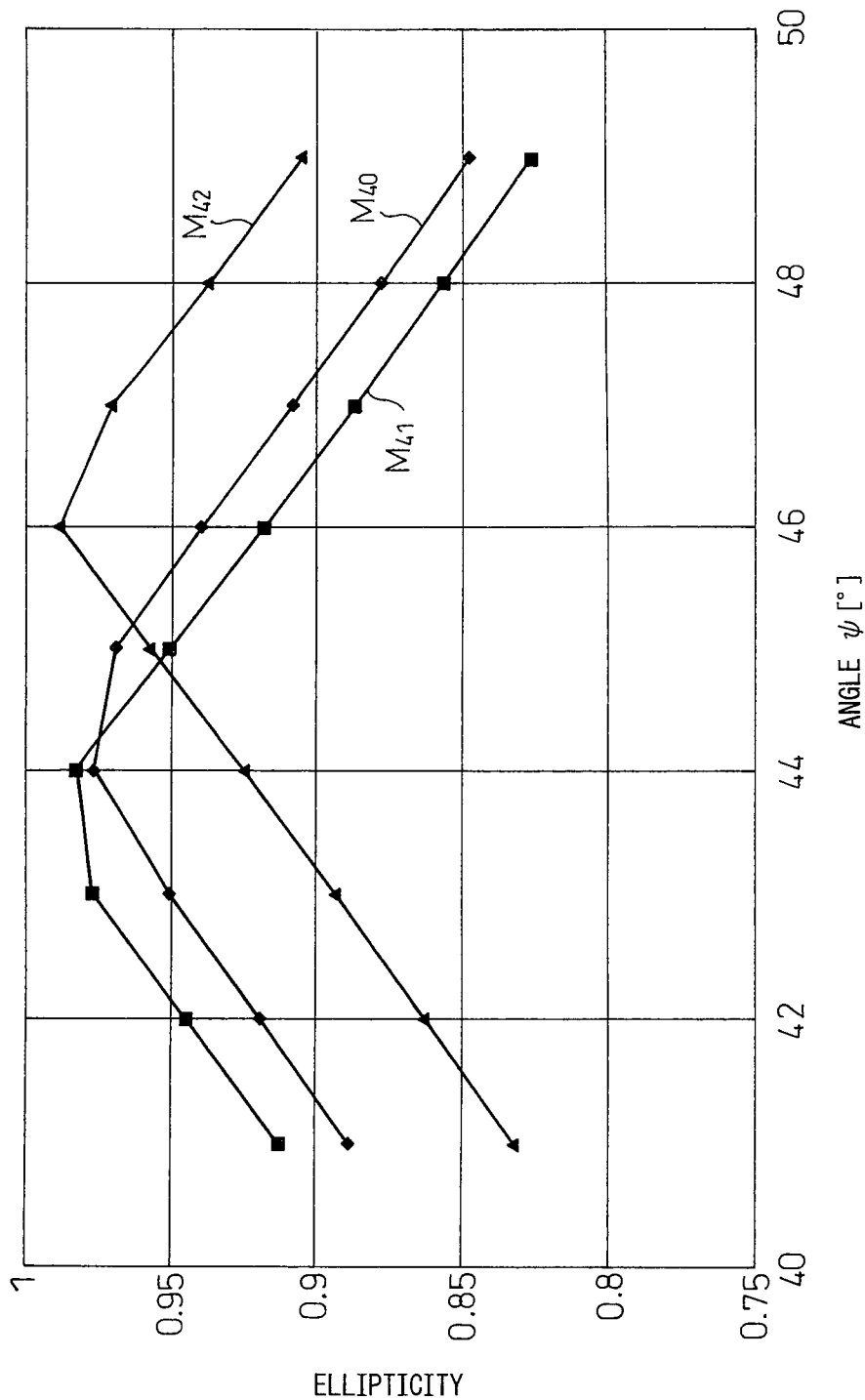
FIG. 11 is a diagram showing the relationship between angle Ψ and ellipticity when the angle α is +2.0 degrees.

FIG. 11 is a diagram showing the relationship between the angle ψ and the ellipticity when the angle α is +2.0 degrees.

In FIG. 11, curve $M_{40}$ shows the case where the second liquid crystal layer 120 was made to function as a 7λ/4 plate, curve $M_{41}$ shows the case where the second liquid crystal layer 120 was made to function as a 5λ/4 plate, and curve $M_{42}$ shows the case where the second liquid crystal layer 120 was made to function as a 3λ/4 plate. The plus and minus signs of the angle α indicate the same directions as those defined in FIG. 2(a).

As shown in FIG. 11, it can be seen that when the second liquid crystal layer 120 is made to function as a 7λ/4 plate, the second liquid crystal layer 120 functions most effectively as the so-called λ/4 plate when the angle ψ is 44 degrees, and functions effectively as the so-called λ/4 plate when the angle ψ is within the range of 43 to 45 degrees. It can also been seen that when the second liquid crystal layer 120 is made to function as a 5λ/4 plate, the second liquid crystal layer 120 functions most effectively as the so-called λ/4 plate when the angle ψ is 44 degrees, and functions effectively as the so-called λ/4 plate when the angle ψ is within the range of 43 to 45 degrees. Further, it can be seen that when the second liquid crystal layer 120 is made to function as a 3λ/4 plate, the second liquid crystal layer 120 functions most effectively as the so-called λ/4 plate when the angle ψ is 46 degrees, and functions effectively as the so-called λ/4 plate when the angle ψ is within the range of 45 to 47 degrees.

Figure 12:
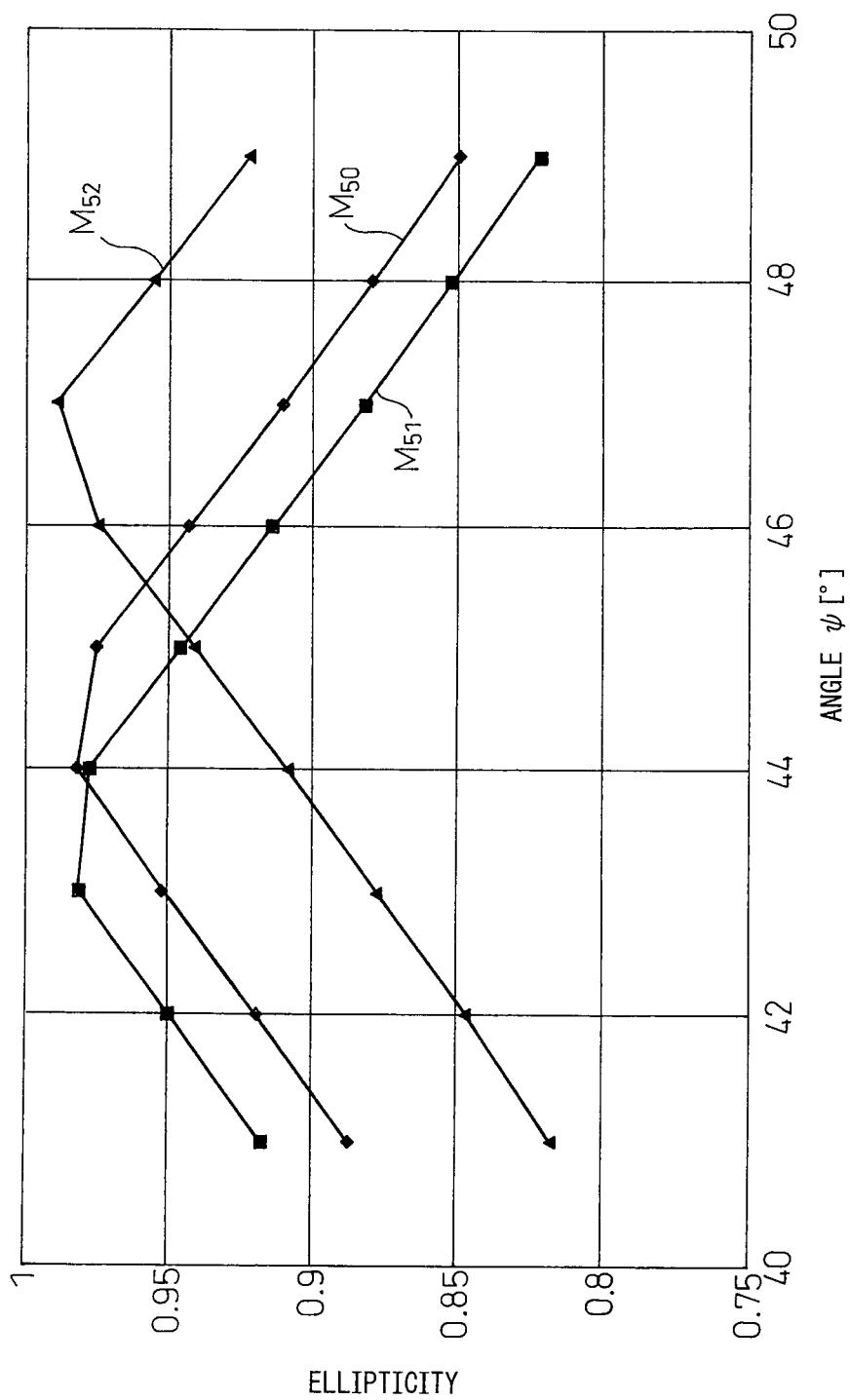
FIG. 12 is a diagram showing the relationship between angle Ψ and ellipticity when the angle α is +2.5 degrees.

FIG. 12 is a diagram showing the relationship between the angle ψ and the ellipticity when the angle α is +2.5 degrees.

In FIG. 12, curve $M_{50}$ shows the case where the second liquid crystal layer 120 was made to function as a 7λ/4 plate, curve $M_{51}$ shows the case where the second liquid crystal layer 120 was made to function as a 5λ/4 plate, and curve $M_{52}$ shows the case where the second liquid crystal layer 120 was made to function as a 3λ/4 plate. The plus and minus signs of the angle α indicate the same directions as those defined in FIG. 2(a).

As shown in FIG. 12, it can be seen that when the second liquid crystal layer 120 is made to function as a 7λ/4 plate, the second liquid crystal layer 120 functions most effectively as the so-called λ/4 plate when the angle ψ is 44 degrees, and functions effectively as the so-called λ/4 plate when the angle ψ is within the range of 43 to 45 degrees. It can also been seen that when the second liquid crystal layer 120 is made to function as a 5λ/4 plate, the second liquid crystal layer 120 functions most effectively as the so-called λ/4 plate when the angle ψ is 43 degrees, and functions effectively as the so-called λ/4 plate when the angle ψ is within the range of 42 to 44 degrees. Further, it can be seen that when the second liquid crystal layer 120 is made to function as a 3λ/4 plate, the second liquid crystal layer 120 functions most effectively as the so-called λ/4 plate when the angle ψ is 47 degrees, and functions effectively as the so-called λ/4 plate when the angle ψ is within the range of 46 to 48 degrees.

Figure 13:
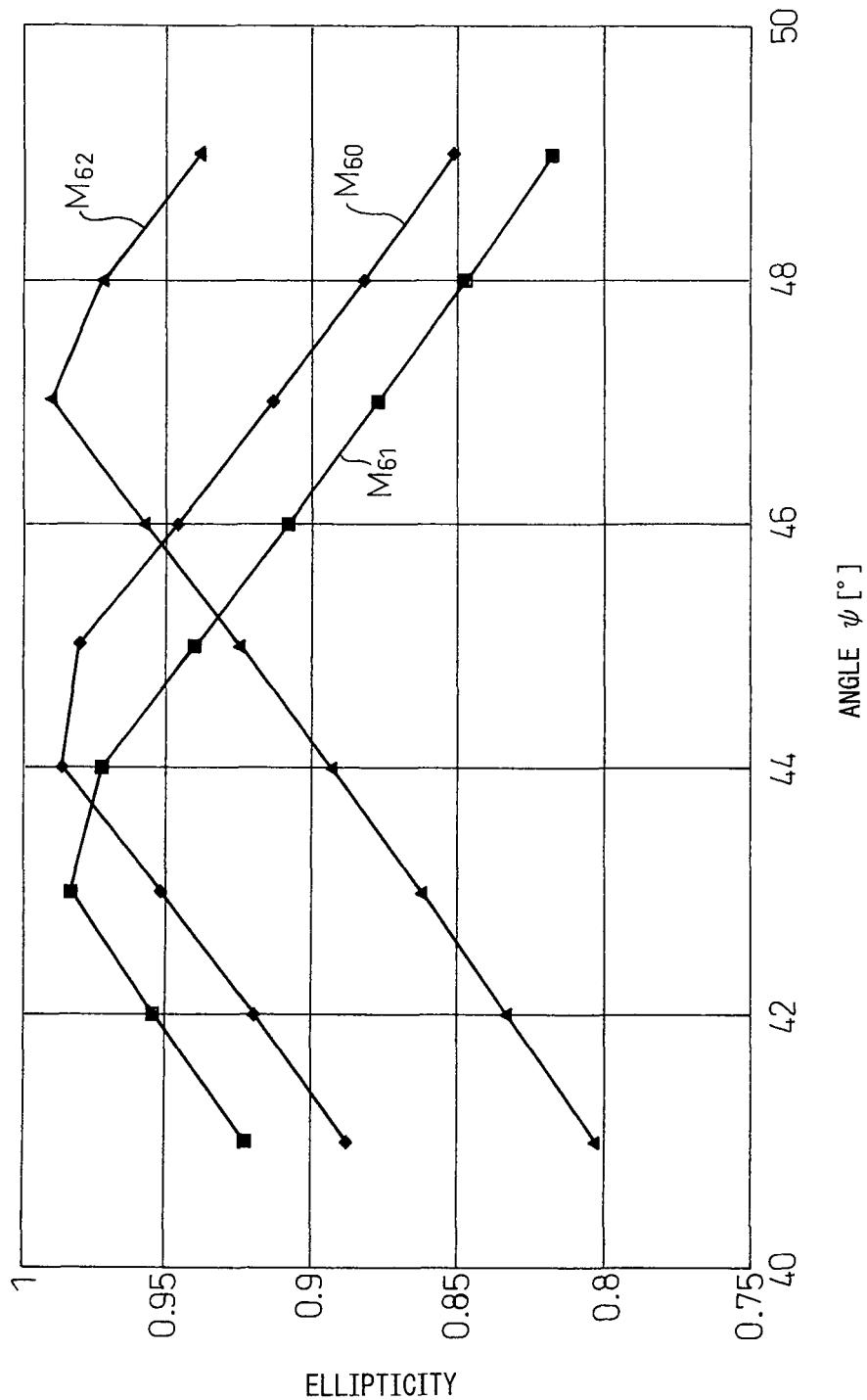
FIG. 13 is a diagram showing the relationship between angle Ψ and ellipticity when the angle α is +3.0 degrees.

FIG. 13 is a diagram showing the relationship between the angle ψ and the ellipticity when the angle α is +3.0 degrees.

In FIG. 13, curve $M_{60}$ shows the case where the second liquid crystal layer 120 was made to function as a 7λ/4 plate, curve $M_{61}$ shows the case where the second liquid crystal layer 120 was made to function as a 5λ/4 plate, and curve $M_{62}$ shows the case where the second liquid crystal layer 120 was made to function as a 3λ/4 plate. The plus and minus signs of the angle α indicate the same directions as those defined in FIG. 2(a).

As shown in FIG. 13, it can be seen that when the second liquid crystal layer 120 is made to function as a 7λ/4 plate, the second liquid crystal layer 120 functions most effectively as the so-called λ/4 plate when the angle ψ is 44 degrees, and functions effectively as the so-called λ/4 plate when the angle ψ is within the range of 43 to 45 degrees. It can also been seen that when the second liquid crystal layer 120 is made to function as a 5λ/4 plate, the second liquid crystal layer 120 functions most effectively as the so-called λ/4 plate when the angle ψ is 43 degrees, and functions effectively as the so-called λ/4 plate when the angle ψ is within the range of 42 to 44 degrees. Further, it can be seen that when the second liquid crystal layer 120 is made to function as a 3λ/4 plate, the second liquid crystal layer 120 functions most effectively as the so-called λ/4 plate when the angle ψ is 47 degrees, and functions effectively as the so-called λ/4 plate when the angle ψ is within the range of 46 to 48 degrees.

Figure 14:
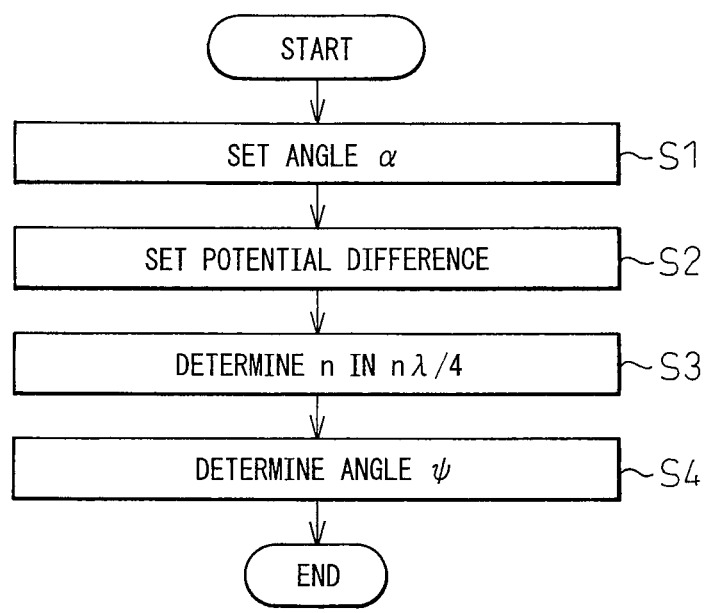
FIG. 14 is a diagram showing the process for determining the angle Ψ.

FIG. 14 is a flow diagram illustrating the process for determining the angle ψ.

First, the angle α (see FIGS. 2 and 4) at which to mount the liquid crystal optical element 100 in the optical pickup apparatus 10 is set (S1).

Next, the maximum value of the supply voltage that can be supplied to the liquid crystal optical element 100, i.e., the maximum value of the potential difference that can be generated between the second transparent electrode 158 and second transparent counter electrode 155 of the second liquid crystal layer, is set (S2).

The angle α and the maximum potential difference are set in advance as the specification for the liquid crystal optical element.

Next, based on the maximum potential difference set in S2, it is determined how the n in the nλ/4 should be set (S3). For example, in the example shown in FIG. 7, when the maximum potential difference is 2.5 [Vrms], it is determined that n=5, i.e., the second liquid crystal layer 120 should be made to function as a 5λ/4 plate. A plurality of n's may be selected based on the maximum potential difference.

Next, from the n in the nλ/4 determined in S3 and the angle α set in S1, the angle ψ is determined (S4) to complete the process. For example, when the angle α is set to +1.5 degrees, it is determined from FIG. 10 that the best angle ψ for achieving the 5λ/4 plate is 44 degrees.

When the liquid crystal optical element 100 is fabricated by setting the rubbing direction 121 of the second liquid crystal layer 120 so as to match the angle ψ (for example, 44 degrees) determined by the process of FIG. 14, and the thus fabricated liquid crystal optical element 100 is mounted by tilting it at the angle α (+1.5 degrees) in the optical pickup apparatus 10, the second liquid crystal layer 120 functions effectively as the so-called λ/4 plate.

The examples of FIGS. 7 to 13 have been shown to exemplify the relationship between the potential difference and the ellipticity and the relationship between the angle ψ and the ellipticity for various values of the angle α for the case of the typical light source wavelength and the typical liquid crystal layer. When actually designing the second liquid crystal layer, the optimum angle ψ is determined in accordance with the process shown in FIG. 14, based on the angle α and the maximum potential difference and on the data defining the relationship between the potential difference and the ellipticity and the relationship between the angle ψ and the ellipticity for the liquid crystal layer to be fabricated. The description so far given has dealt with the structure of the liquid crystal optical element 100 for the case where the ambient temperature is 25° C. However, in the liquid crystal optical element 100 according to the present invention, if the ambient temperature deviates from 25° C., the angle once set based on the angle α need not be changed, and the liquid crystal layer can be made to function as the intended nλ/4 plate by controlling in accordance with the temperature change the voltages to be applied to the first and second liquid crystal layers 110 and 120.

FIG. 15 is a diagram for explaining another example of the electrode pattern of the first transparent electrode and its function.

FIG. 15(a) shows a coma correcting transparent electrode pattern formed as the first transparent electrode 151, FIG. 15(b) shows an example of the voltage applied to the transparent electrode pattern of the first transparent electrode 151, and FIG. 15(c) shows an example of coma as improved by the transparent electrode pattern of the first transparent electrode 151.

In the optical pickup apparatus 10 which reads or writes data on the recording medium 4, as shown in FIG. 1 the light beam from the light source 11 is converted by the collimator lens 12 into a substantially parallel beam of light, which is then focused by the objective lens 14 onto the recording medium 4, and an information signal is generated by receiving the light beam reflected from the recording medium 4. In such an optical pickup apparatus, when reading or writing data on the recording medium, the light beam focused by the objective lens 14 must be made to accurately follow the track of the recording medium 4. However, there are cases where the recording medium 4 is tilted because of warping or deflection of the recording medium 4 or imperfections in the driving mechanism of the recording medium 4. When the optical axis of the light beam focused by the objective lens 14 is tilted relative to the track of the recording medium 4, an aberration called coma occurs in the substrate of the recording medium 4; i.e., coma 620 such as shown in FIG. 15(b) occurs when seen at the position of the entrance pupil of the objective lens 14, and this can lead to a degradation of the information signal which is generated based on the reflected beam from the recording medium 4.

In FIG. 15(a), electrode patterns 601 to 605 are formed as shown within the range of the effective diameter 2. Voltage 610 such as shown in FIG. 15(b) is applied to each region. When the voltage 610 such as shown in FIG. 15(b) is applied to the transparent electrode pattern of the first transparent electrode 151 such as shown in FIG. 15(a), a potential difference occurs with respect to the first transparent counter electrode 154, and the alignment of the liquid crystal between them changes according to the potential difference. As a result, the light beam passing through this portion experiences an effect that advances its phase according to the potential difference. With this effect, the coma 620 occurring in the substrate of the recording medium 4 is corrected as shown by the coma 630 in FIG. 15(c). The voltage to be applied to the transparent electrode pattern of the first transparent electrode 151 is supplied via the flexible board 140.

The pattern of the first transparent electrode 151 shown in FIG. 15(a) described above can be used in place of the transparent electrode pattern shown in FIG. 5. In that case, the liquid crystal optical element 100 can correct coma.

FIG. 16 is a diagram for explaining still another example of the electrode pattern of the first transparent electrode and its function.

Figure 16A:
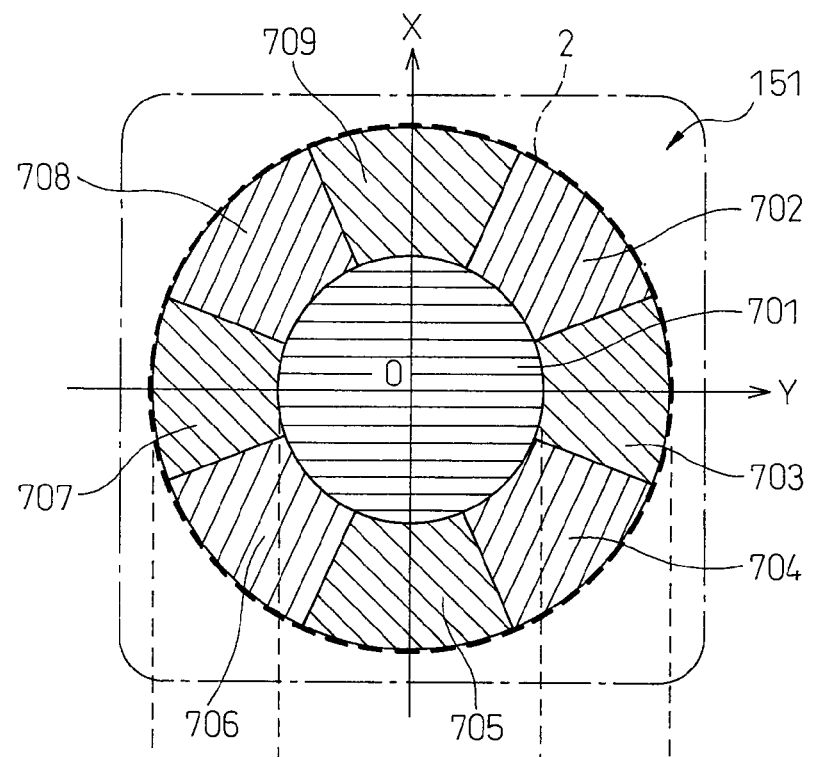
FIG. 16(a) is a diagram showing an astigmatism correcting transparent electrode pattern formed as the first transparent electrode 151.
Figure 16B:
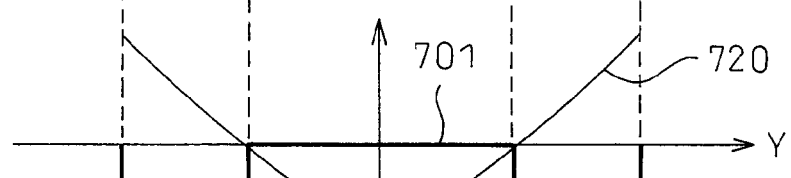
FIG. 16(b) is a diagram showing an example of the voltage applied in the Y-axis direction of the transparent electrode pattern of the first transparent electrode 151.
Figure 16C:
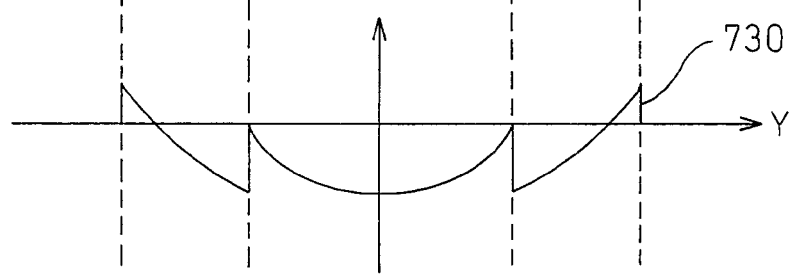
FIG. 16(c) is a diagram showing an example of astigmatism in the Y-axis direction as improved by the transparent electrode pattern of the first transparent electrode 151.
Figure 17A:
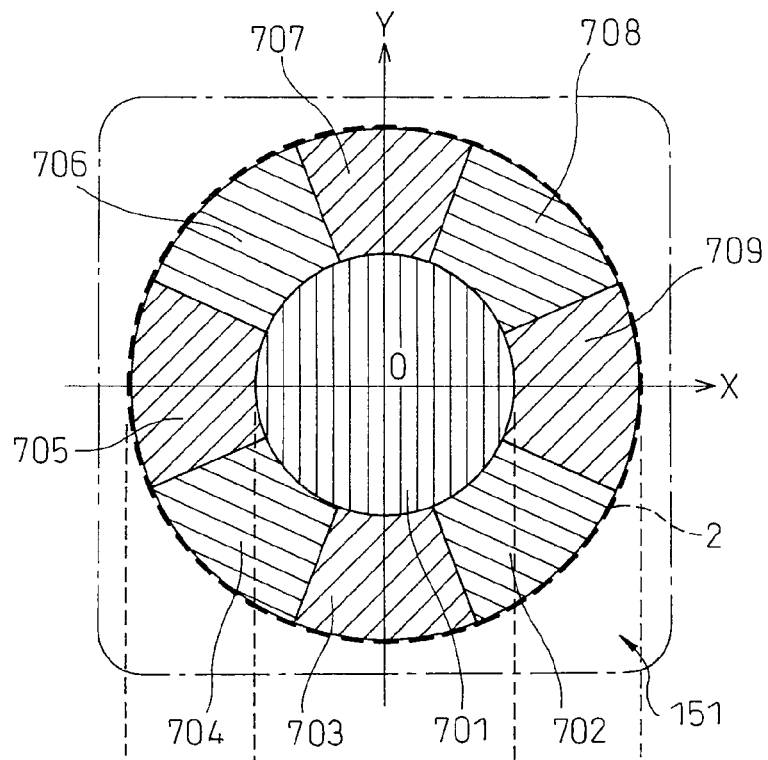
FIG. 17(a) is a diagram showing an astigmatism correcting transparent electrode pattern formed as the first transparent electrode 151.

FIG. 16(a) shows an astigmatism correcting transparent electrode pattern formed as the first transparent electrode 151, FIG. 16(b) shows an example of the voltage applied in the Y-axis direction of the transparent electrode pattern of the first transparent electrode 151, and FIG. 16(c) shows an example of astigmatism in the Y-axis direction as improved by the transparent electrode pattern of the first transparent electrode 151. FIG. 17(a) shows the transparent electrode pattern of FIG. 16(a) when it is rotated through 90 degrees, FIG. 17(b) shows an example of the voltage applied in the X-axis direction of the transparent electrode pattern of the first transparent electrode 151, and FIG. 17(c) shows an example of astigmatism in the X-axis direction as improved by the transparent electrode pattern of the first transparent electrode 151.

Figure 17B:
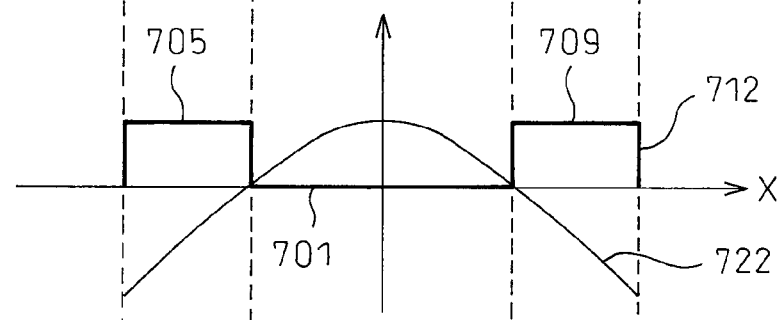
FIG. 17(b) is a diagram showing an example of the voltage applied in the X-axis direction of the transparent electrode pattern of the first transparent electrode 151.
Figure 17C:
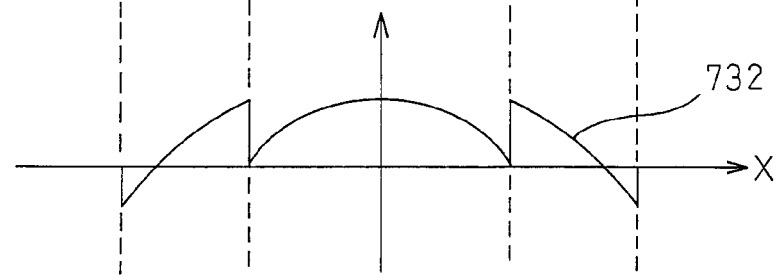
FIG. 17(c) is a diagram showing an example of astigmatism in the X-axis direction as improved by the transparent electrode pattern of the first transparent electrode 151.

In the optical pickup apparatus 10 which reads or writes data on the recording medium 4, due to the problem of the astigmatic difference of the semiconductor laser, etc. astigmatism 720 such as shown in FIG. 16(b) occurs in the Y-axis direction in the light beam emitted from the light source 11, and astigmatism 722 such as shown in FIG. 17(b) occurs in the X-axis direction, leading to a degradation of the information signal which is generated based on the reflected beam from the recording medium 4.

In FIG. 16(a) or 17(a), electrode patterns 701 to 709 are formed as shown within the range of the effective diameter 2. Voltage 710 such as shown in FIG. 16(b) and voltage 712 such as shown in FIG. 17(b) are applied to each region. When the voltage 710 such as shown in FIG. 16(b) and the voltage 712 such as shown in FIG. 17(b) are applied to the transparent electrode pattern of the first transparent electrode 151 such as shown in FIG. 16(a) or 17(a), a potential difference occurs with respect to the first transparent counter electrode 154, and the alignment of the liquid crystal between them changes according to the potential difference. As a result, the light beam passing through this portion experiences an effect that advances its phase according to the potential difference. With this effect, the astigmatism 720 in the Y-axis direction and the astigmatism 722 in the X-axis direction, occurring in the substrate of the recording medium 4, are corrected as shown by the astigmatism 730 in FIG. 16(c) and the astigmatism 732 in FIG. 17(c), respectively. The voltage to be applied to the transparent electrode pattern of the first transparent electrode 151 is supplied via the flexible board 140.

The pattern of the first transparent electrode 151 shown in FIGS. 16(a) and 17(a) described above can be used in place of the transparent electrode pattern shown in FIG. 5. Therefore, the liquid crystal optical element 100 can correct astigmatism.

What is claimed is:

1. An optical pickup apparatus comprising:
   a light source for emitting a light beam;
   a liquid crystal optical element constructed by combining in an integral fashion:
     a first liquid crystal layer for correcting aberration, said first liquid crystal layer having:
       a first rubbing direction; and
       a pre-tilt angle; and
     a second liquid crystal layer having a second rubbing direction,
     said liquid crystal optical element being mounted at a tilt angle with respect to an optical axis of said light beam, a direction of said tilt angle being a direction which cancels said pre-tilt angle;
   a transparent electrode for generating a potential difference across said second liquid crystal layer sufficient to control an amount of phase difference for said light beam passing through said second liquid crystal layer; and an objective lens for focusing the light beam passed through said liquid crystal optical element,
wherein:
said liquid crystal optical element is tilted at said tilt angle around a tilting axis, said tilting axis being perpendicular to said first rubbing direction; and
an angle between said second rubbing direction and said first rubbing direction is determined in accordance with said tilt angle and said potential difference so that said second liquid crystal layer functions as an $n\lambda/4$ plate.

2. The optical pickup apparatus according to claim 1, further comprising a power supply part for supplying a voltage so that said transparent electrode generates a prescribed potential difference.

3. The optical pickup apparatus according to claim 1, wherein the angle between said second rubbing direction and said first rubbing direction is determined in accordance with said tilt angle, said potential difference, and an operating temperature range so that said second liquid crystal layer functions as an $n\lambda/4$ plate.

4. The optical pickup apparatus according to claim 1, wherein said first liquid crystal layer corrects coma, spherical aberration, or astigmatism.

5. The optical pickup apparatus according to claim 1, wherein said first liquid crystal layer and said second liquid crystal layer are provided alternately between three transparent substrates.

6. The optical pickup apparatus according to claim 1, wherein the angle between said second rubbing direction and said first rubbing direction is about 45 degrees.

7. A liquid crystal optical element mounted at a tilt angle with respect to an optical axis, comprising:
a first liquid crystal layer for correcting aberration, said first liquid crystal layer having:
a first rubbing direction; and
a pre-tilt angle, a direction of said tilt angle being a direction which cancels the pre-tilt angle;
a second liquid crystal layer having a second rubbing direction and combined with said first liquid crystal layer in an integral fashion; and
a transparent electrode for generating a potential difference across said second liquid crystal layer sufficient to control an amount of phase difference for a light beam passing through said second liquid crystal layer,
wherein:
said liquid crystal optical element is tilted at said tilt angle around a tilting axis, said tilting axis being perpendicular to said first rubbing direction; and
an angle between said second rubbing direction and said first rubbing direction is determined in accordance with said tilt angle and said potential difference so that said second liquid crystal layer functions as an $n\lambda/4$ plate.

8. The liquid crystal optical element according to claim 7, further comprising a power supply part for supplying a voltage so that said transparent electrode generates a prescribed potential difference.

9. The liquid crystal optical element according to claim 7, wherein the angle between said second rubbing direction and said first rubbing direction is determined in accordance with said tilt angle, said potential difference, and an operating temperature range so that said second liquid crystal layer functions as an $n\lambda/4$ plate.

10. The liquid crystal optical element according to claim 7, wherein said first liquid crystal layer corrects coma, spherical aberration, or astigmatism.

11. The liquid crystal optical element according to claim 7, wherein said first liquid crystal layer and said second liquid crystal layer are provided alternately between three transparent substrates.

12. The liquid crystal optical element according to claim 7, wherein the angle between said second rubbing direction and said first rubbing direction is about 45 degrees.

13. A method of manufacturing an optical pickup apparatus comprising:
constructing a liquid crystal optical element by combining in an integral fashion:
a first liquid crystal layer for correcting aberration, said first liquid crystal layer having a first rubbing direction and a pre-tilt angle; and
a second liquid crystal layer having a second rubbing direction; and
mounting said liquid crystal optical element at a tilt angle with respect to an optical axis of a light beam to cancel said pre-tilt angle of said first liquid crystal layer, said liquid crystal optical element being tilted around a tilting axis perpendicular to said first rubbing direction,
an angle between said first rubbing direction and said second rubbing direction being determined based on said tilt angle so that said second liquid crystal layer functions as an $n\lambda/4$ plate.

14. The method according to claim 13 further comprising:
supplying a potential difference across said second liquid crystal layer in order to control an amount of phase difference for said light beam passing through said second liquid crystal layer,
said angle between said first rubbing direction and said second rubbing direction being determined based on said tilt angle and said potential difference so that said second liquid crystal layer functions as an $n\lambda/4$ plate.

15. The method according to claim 14 further comprising:
measuring an operating temperature of said second liquid crystal layer,
said angle between said first rubbing direction and said second rubbing direction being determined based on said tilt angle, said potential difference, and said operating temperature so that said second liquid crystal layer functions as an $n\lambda/4$ plate.

* * * * *